(12) United States Patent
Yang et al.

(10) Patent No.: US 10,043,095 B2
(45) Date of Patent: Aug. 7, 2018

(54) DATA STRUCTURE FOR CNN BASED DIGITAL INTEGRATED CIRCUIT FOR EXTRACTING FEATURES OUT OF AN INPUT IMAGE

(71) Applicant: GYRFALCON TECHNOLOGY, INC., Milpitas, CA (US)

(72) Inventors: Lin Yang, Milpitas, CA (US); Huihua Yu, Shanghai (CN)

(73) Assignee: Gyrfalcon Technology, Inc., Milpitas, CA (US)

( * ) Notice: Subject to any disclaimer, the term of this patent is extended or adjusted under 35 U.S.C. 154(b) by 74 days.

(21) Appl. No.: 15/289,733

(22) Filed: Oct. 10, 2016

(65) Prior Publication Data

US 2018/0101747 A1    Apr. 12, 2018

(51) Int. Cl.
*G06K 9/46* (2006.01)
*G06K 9/00* (2006.01)
*G06N 3/02* (2006.01)

(52) U.S. Cl.
CPC ....... *G06K 9/4628* (2013.01); *G06K 9/00979* (2013.01); *G06K 9/00986* (2013.01); *G06N 3/02* (2013.01)

(58) Field of Classification Search
CPC .. G06K 9/46; G06K 9/00986; G06K 9/00979; G06K 9/4628; G06N 3/02–3/08; G06F 17/15; G06F 17/18; G06F 17/153; G06T 1/00; G06T 1/20; G06T 1/60; G06T 2207/20084
See application file for complete search history.

(56) References Cited

U.S. PATENT DOCUMENTS

| | | |
|---|---|---|
| 5,140,670 A | 8/1992 | Chua et al. |
| 5,355,528 A | 10/1994 | Roska et al. |
| 6,047,276 A | 4/2000 | Manganaro et al. |
| 6,574,565 B1 * | 6/2003 | Bush ........................ G01V 1/30 702/13 |
| 6,754,645 B2 | 6/2004 | Shi et al. |
| 7,457,788 B2 * | 11/2008 | Mishra ..................... G06N 3/08 706/15 |

(Continued)

OTHER PUBLICATIONS

L. Chua et al. "Cellular Neural Networks: Theory", IEEE Transactions on Circuits and Systems, vol. 35, No. 10, pp. 1257-1271 Oct. 1988.

(Continued)

*Primary Examiner* — Michael Osinski
(74) *Attorney, Agent, or Firm* — Roger H. Chu

(57) ABSTRACT

Data arrangement schemes of imagery data and filter coefficients stored in a CNN based digital IC for extracting features out of an input image are disclosed. The CNN based digital IC contains NE number of CNN processing engines connected in a loop via a clock-skew circuit for cyclic data access. Imagery data and filter coefficients are arranged in a specific scheme to fit the data access pattern that the CNN based digital IC requires to operate. The specific scheme is determined based on the number of imagery data, the number of filters and the characteristics of the CNN based digital IC. The characteristics include, but are not limited to, the number of CNN processing engines, the connection direction of clock-skew circuit and the number of the I/O data bus.

12 Claims, 24 Drawing Sheets

(56) References Cited

U.S. PATENT DOCUMENTS

| | | | |
|---|---|---|---|
| 7,937,346 B2* | 5/2011 | Kato | G06N 3/08 382/155 |
| 9,418,319 B2 | 8/2016 | Shen et al. | |
| 9,608,842 B2* | 3/2017 | Naouri | H04L 12/6418 |
| 9,665,799 B1* | 5/2017 | Munteanu | G06K 9/6245 |
| 2007/0292047 A1* | 12/2007 | Jiao | G06F 17/153 382/279 |
| 2010/0223219 A1* | 9/2010 | Kato | G06N 3/08 706/27 |
| 2011/0239032 A1* | 9/2011 | Kato | G06F 17/15 713/500 |
| 2015/0178246 A1* | 6/2015 | Herrero Abellanas | G06F 17/153 708/300 |
| 2015/0261455 A1* | 9/2015 | Gough | G06F 11/14 714/6.24 |
| 2016/0019459 A1* | 1/2016 | Audhkhasi | G06K 9/6217 706/22 |
| 2016/0062947 A1* | 3/2016 | Chetlur | G06F 17/153 708/420 |
| 2016/0093343 A1* | 3/2016 | Ovsiannikov | G06F 12/0802 365/189.02 |
| 2016/0358069 A1* | 12/2016 | Brothers | G06F 7/764 |
| 2017/0103298 A1* | 4/2017 | Ling | G06N 3/04 |
| 2017/0103299 A1* | 4/2017 | Aydonat | G06N 3/04 |
| 2017/0116495 A1* | 4/2017 | Nomura | G06K 9/46 |
| 2017/0200078 A1* | 7/2017 | Bichler | G06N 3/063 |
| 2017/0221176 A1* | 8/2017 | Munteanu | G06T 1/20 |
| 2017/0262962 A1* | 9/2017 | Rad | G06T 3/4046 |
| 2017/0323196 A1* | 11/2017 | Gibson | G06N 3/04 |
| 2018/0005074 A1* | 1/2018 | Shacham | G06K 9/56 |
| 2018/0005344 A1* | 1/2018 | Lim | G06T 1/20 |

OTHER PUBLICATIONS

L. Chua et al. "Cellular Neural Networks: Applications", IEEE Transactions on Circuits and Systems, vol. 35, No. 10, pp. 1273-1290 Oct. 1988.

Angela Slavova "Applications of Some Mathematical Methods in the Analysis of Cellular Neural Networks", Journal of computational and Applied Mathematics 114 (2000) 387-404.

Lee et al. "Color Image Processing in a Cellular Neural-Network Environment" IEEE Transaction on Neural Networks, vol. 7, No. 5. pp. 1086-1098 Sep. 1996.

L. Yang et al. "VLSI Implementation of Cellular Neural Networks", IEEE 1990 CH2868-8/90 pp. 2425-2427.

Korekado et al. "A VLSI Convolutional Neural Network for Image Recognition Using Merged/Mixed Analog-Digital Architecture", 2003.

Duan et al. "Memristor-Based Cellular Nonlinear/Neural Network: Design, Analysis, and Applications", IEEE Transactions on Neural Networks and Learning Systems 2014.

* cited by examiner

First Example
4 CNN Processing Engines #1->#2->#3->#4->#1
8 imagery data with 12 Filters

| | I/O Bus# | I | | II | |
|---|---|---|---|---|---|
| | Engine# | 1 | 2 | 3 | 4 |
| Load | Im(j) | 1 | 2 | 3 | 4 |
| | F(i,j) | 1,1 | 2,2 | 3,3 | 4,4 |
| | | 1,4 | 2,1 | 3,2 | 4,3 |
| | | 1,3 | 2,4 | 3,1 | 4,2 |
| | | 1,2 | 2,3 | 3,4 | 4,1 |
| Load | Im(j) | 5 | 6 | 7 | 8 |
| | F(i,j) | 1,5 | 2,6 | 3,7 | 4,8 |
| | | 1,8 | 2,5 | 3,6 | 4,7 |
| | | 1,7 | 2,8 | 3,5 | 4,6 |
| | | 1,6 | 2,7 | 3,8 | 4,5 |
| Output | | Out(1) | Out(2) | Out(3) | Out(4) |
| Load | Im(j) | 1 | 2 | 3 | 4 |
| | F(i,j) | 5,1 | 6,2 | 7,3 | 8,4 |
| | | 5,4 | 6,1 | 7,2 | 8,3 |
| | | 5,3 | 6,4 | 7,1 | 8,2 |
| | | 5,2 | 6,3 | 7,4 | 8,1 |
| Load | Im(j) | 5 | 6 | 7 | 8 |
| | F(i,j) | 5,5 | 6,6 | 7,7 | 8,8 |
| | | 5,8 | 6,5 | 7,6 | 8,7 |
| | | 5,7 | 6,8 | 7,5 | 8,6 |
| | | 5,6 | 6,7 | 7,8 | 8,5 |
| Output | | Out(5) | Out(6) | Out(7) | Out(8) |
| Load | Im(j) | 1 | 2 | 3 | 4 |
| | F(i,j) | 9,1 | 10,2 | 11,3 | 12,4 |
| | | 9,4 | 10,1 | 11,2 | 12,3 |
| | | 9,3 | 10,4 | 11,1 | 12,2 |
| | | 9,2 | 10,3 | 11,4 | 12,1 |
| Load | Im(j) | 5 | 6 | 7 | 8 |
| | F(i,j) | 9,5 | 10,6 | 11,7 | 12,8 |
| | | 9,8 | 10,5 | 11,6 | 12,7 |
| | | 9,7 | 10,8 | 11,5 | 12,6 |
| | | 9,6 | 10,7 | 11,8 | 12,5 |
| Output | | Out(9) | Out(10) | Out(11) | Out(12) |

*FIG. 15A*

Second Example
4 CNN Processing Engines #1<-#2<-#3<-#4<-#1
8 imagery data with 12 Filters

| | I/O Bus# | I | | II | |
|---|---|---|---|---|---|
| | Engine# | 1 | 2 | 3 | 4 |
| Load | Im(j) | 1 | 2 | 3 | 4 |
| | F(i,j) | 1,1 | 2,2 | 3,3 | 4,4 |
| | | 1,2 | 2,3 | 3,4 | 4,1 |
| | | 1,3 | 2,4 | 3,1 | 4,2 |
| | | 1,4 | 2,1 | 3,2 | 4,3 |
| Load | Im(j) | 5 | 6 | 7 | 8 |
| | F(i,j) | 1,5 | 2,6 | 3,7 | 4,8 |
| | | 1,6 | 2,7 | 3,8 | 4,5 |
| | | 1,7 | 2,8 | 3,5 | 4,6 |
| | | 1,8 | 2,5 | 3,6 | 4,7 |
| Output | | Out(1) | Out(2) | Out(3) | Out(4) |
| Load | Im(j) | 1 | 2 | 3 | 4 |
| | F(i,j) | 5,1 | 6,2 | 7,3 | 8,4 |
| | | 5,2 | 6,3 | 7,4 | 8,1 |
| | | 5,3 | 6,4 | 7,1 | 8,2 |
| | | 5,4 | 6,1 | 7,2 | 8,3 |
| Load | Im(j) | 5 | 6 | 7 | 8 |
| | F(i,j) | 5,5 | 6,6 | 7,7 | 8,8 |
| | | 5,6 | 6,7 | 7,8 | 8,5 |
| | | 5,7 | 6,8 | 7,5 | 8,6 |
| | | 5,8 | 6,5 | 7,6 | 8,7 |
| Output | | Out(5) | Out(6) | Out(7) | Out(8) |
| Load | Im(j) | 1 | 2 | 3 | 4 |
| | F(i,j) | 9,1 | 10,2 | 11,3 | 12,4 |
| | | 9,2 | 10,3 | 11,4 | 12,1 |
| | | 9,3 | 10,4 | 11,1 | 12,2 |
| | | 9,4 | 10,1 | 11,2 | 12,3 |
| Load | Im(j) | 5 | 6 | 7 | 8 |
| | F(i,j) | 9,5 | 10,6 | 11,7 | 12,8 |
| | | 9,6 | 10,7 | 11,8 | 12,5 |
| | | 9,7 | 10,8 | 11,5 | 12,6 |
| | | 9,8 | 10,5 | 11,6 | 12,7 |
| Output | | Out(9) | Out(10) | Out(11) | Out(12) |

*FIG. 15B*

Engine #1

| Im(1) |
|---|
| Im(17) |
| Im(33) |
| Im(49) |

⋮

Engine #9

| Im(9) |
|---|
| Im(25) |
| Im(41) |
| Im(57) |

DATA STRUCTURE FOR CNN BASED DIGITAL INTEGRATED CIRCUIT FOR EXTRACTING FEATURES OUT OF AN INPUT IMAGE

CROSS-REFERENCE TO RELATED APPLICATIONS

This application is related to a U.S. patent application Ser. No. 15/289,726 for "Digital Integrated Circuit For Extracting Features Out Of An Input Image Based On Cellular Neural Networks" filed on Oct. 10, 2016 by Lin Yang and Huihua Yu.

FIELD

The invention generally relates to the field of integrated circuit and more particularly to data structure configured for a CNN based digital integrated circuit for extracting features out of an input image.

BACKGROUND

Cellular Neural Networks or Cellular Nonlinear Networks (CNN) have been applied to many different fields and problems including, but limited to, image processing since 1988. However, most of the prior art CNN approaches are either based on software solutions (e.g., Convolutional Neural Networks, Recurrent Neural Networks, etc.) or based on hardware that are designed for other purposes (e.g., graphic processing, general computation, etc.). As a result, CNN prior approaches are too slow in term of computational speed and/or too expensive thereby impractical for processing large amount of imagery data. The imagery data can be from any two-dimensional signals (e.g., a still photo, a picture, a frame of a video stream, etc.)

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Data structure of A CNN based digital integrated circuit (IC) for extracting features out of a input image is disclosed. According to one aspect, imagery data and filter coefficients are arranged in a specific scheme to fit the data access pattern that the CNN based digital integrated circuit requires to operate. The specific scheme is determined based on the number of imagery data, the number of filters and the characteristics of the CNN based digital IC. The characteristics include, but are not limited to, the number of CNN processing engines, the connection direction of clock-skew circuit and the number of the I/O data bus.

According to another aspect, a method of arranging imagery data and filter coefficients stored in a Cellular Neural Networks (CNN) based digital integrated circuit (IC) for extracting features out of an input image is disclosed. The CNN based digital IC contains NE number of CNN processing engines connected in a loop via a clock-skew circuit, where NE is a positive integer. The method includes the following steps and actions:
(a) determining number of imagery data groups required for storing NIM sets of imagery data in the CNN processing engines, each imagery data group containing NE sets of the NIM sets of imagery data, where NIM is a positive integer;
(b) circularly storing the NE sets of the imagery data of each imagery data group in the respective CNN processing engines;
(c) repeating (b) for the remaining imagery data groups;
(d) determining number of filter groups required for storing all filter coefficients for NF number of filters in the CNN processing engines, each filter group containing NE sets of filter coefficients and said each filter group being further divided into one or more subgroups with each subgroup containing a portion of the NE sets that correlates to a corresponding group of the imagery data groups, where NF is a positive integer;
(e) storing the portion of the NE sets of filter coefficients in a corresponding one of the CNN processing engines, the portion of filter coefficients being arranged in a cyclic order for accommodating convolution operations with imagery data received from an upstream neighbor CNN processing engine; and
(f) repeating (e) for the remaining subgroups; and (g) repeating (e) and (f) for the remaining filter groups.

According to yet another aspect, the integrated circuit contains a plurality of identical cellular neural networks (CNN) processing engines operatively coupled to at least one input/output (I/O) data bus. A CNN processing engine controller is configured on the IC for controlling various operations of the CNN processing engines. Each CNN processing engine includes a CNN processing block, a first set of memory buffers for storing imagery data and a second set of memory buffers for storing filter coefficients. The CNN processing block is configured to simultaneously perform 3×3 convolutions at M×M pixel locations using received imagery data and filter coefficients. Imagery data covers a (M+2)-pixel by (M+2)-pixel region of the input image. The M×M pixel locations are the central portion of the (M+2)-pixel by (M+2)-pixel region. Filter coefficients include nine weights coefficients and one offset coefficient. The M×M convolution operations results produced from the CNN processing block are rectified or other nonlinear operations, and may subject to a 2×2 pooling operation to reduce the output results to (M/2)×(M/2). The output results are then fed back to the CNN processing block for further operation of extracting features. M is a positive integer. In one embodiment, M equals to 14.

According to yet another aspect, when two or more CNN processing engines are configured on the IC, the CNN processing engines are connected to one another to form a cyclic data access loop via a clock-skew circuit. The clock-skew circuit enables the CNN processing engine receiving imagery data from a first neighbor CNN processing engine while sending its own imagery data to a second neighbor CNN processing engine.

According to yet another aspect, each digital semiconductor chip contains more than one copy of the digital integrated circuit described above.

According to yet another aspect, the integrated circuit contains one CNN processing engine operatively coupled to an input/output data bus. A CNN processing engine controller is also configured on the IC for controlling operations of the CNN processing engine.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

FIG. 15A is a diagram showing a first example data pattern of imagery data and filter coefficients for a CNN based digital IC with four CNN processing engines and two I/O data bus in accordance with one embodiment of the invention;

FIG. 15B is a diagram showing a second example data pattern of imagery data and filter coefficients for a CNN based digital IC with four CNN processing engines and two I/O data bus in accordance with one embodiment of the invention;

FIG. 17 is a diagram showing an example data arrangement of imagery data according to one embodiment of the invention.

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or circuits representing one or more embodiments of the invention do not inherently indicate any particular order nor imply any limitations in the invention. Used herein, the terms "top", "bottom", "right" and "left" are intended to provide relative positions for the purposes of description, and are not intended to designate an absolute frame of reference Embodiments of the invention are discussed herein with reference to FIGS. 1A-18. However, those skilled in the art will readily appreciate that the detailed description given herein with respect to these figures is for explanatory purposes as the invention extends beyond these limited embodiments.

Figure 1A:
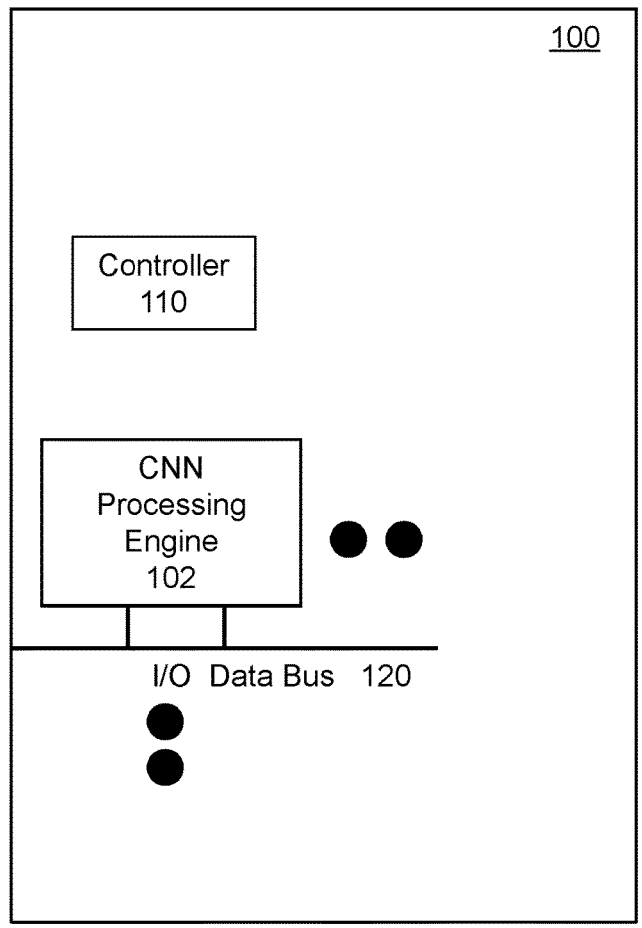
FIGS. 1A-1B are block diagrams illustrating an example integrated circuit designed for extracting features from input imagery data in accordance with one embodiment of the invention.

Referring first to FIG. 1A, it is shown a block diagram illustrating an example digital integrated circuit (IC) 100 for extracting features out of an input image in accordance with one embodiment of the invention.

The integrated circuit 100 is implemented as a digital semi-conductor chip and contains a CNN processing engine controller 110, and one or more neural networks (CNN) processing engines 102 operatively coupled to at least one input/output (I/O) data bus 120. Controller 110 is configured to control various operations of the CNN processing engines 102 for extracting features out of an input image based on an image processing technique by performing multiple layers of 3×3 convolutions with rectifications or other nonlinear operations (e.g., sigmoid function), and 2×2 pooling operations. To perform 3×3 convolutions requires imagery data in digital form and corresponding filter coefficients, which are supplied to the CNN processing engine 102 via input/output data bus 120. It is well known that digital semi-conductor chip contains logic gates, multiplexers, register files, memories, state machines, etc.

According to one embodiment, the digital integrated circuit 100 is extendable and scalable. For example, multiple copy of the digital integrated circuit 100 can be implemented on one semiconductor chip.

Figure 1B:
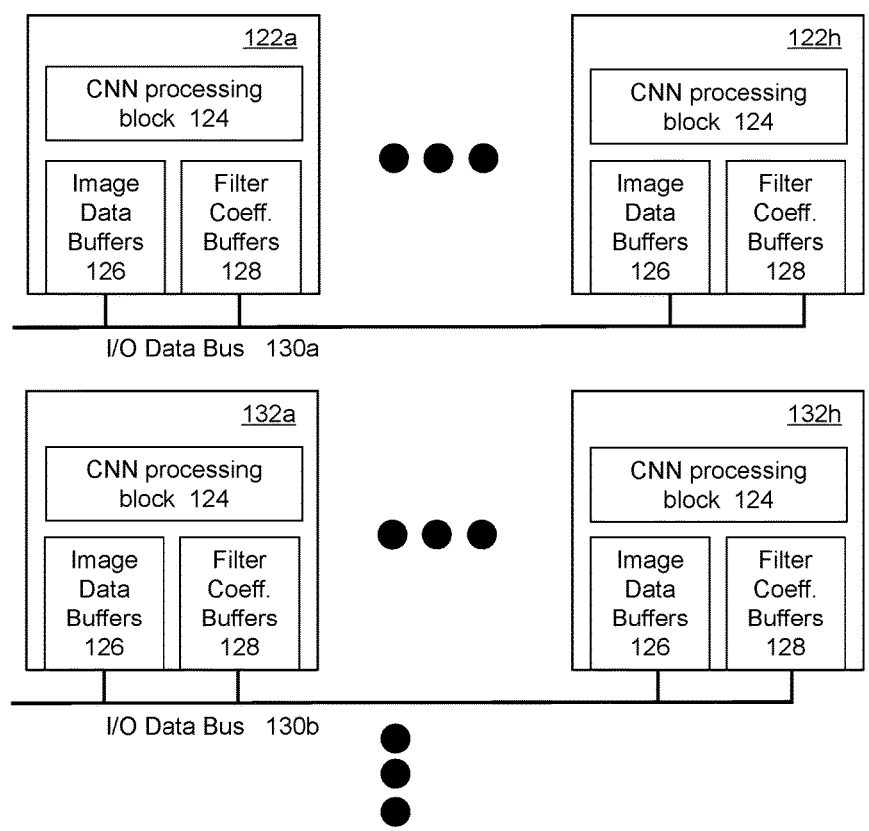

All of the CNN processing engines are identical. For illustrating simplicity, only few (i.e., CNN processing engines 122a-122h, 132a-132h) are shown in FIG. 1B. The invention sets no limit to the number of CNN processing engines on a digital semi-conductor chip.

Each CNN processing engine 122a-122h, 132a-132h contains a CNN processing block 124, a first set of memory buffers 126 and a second set of memory buffers 128. The first set of memory buffers 126 is configured for receiving imagery data and for supplying the already received imagery data to the CNN processing block 124. The second set of memory buffers 128 is configured for storing filter coefficients and for supplying the already received filter coefficients to the CNN processing block 124. In general, the number of CNN processing engines on a chip is $2^n$, where n is an integer (i.e., 0, 1, 2, 3, . . . ). As shown in FIG. 1B, CNN processing engines 122a-122h are operatively coupled to a first input/output data bus 130a while CNN processing engines 132a-132h are operatively coupled to a second input/output data bus 130b. Each input/output data bus 130a-130b is configured for independently transmitting data (i.e., imagery data and filter coefficients). In one embodiment, the first and the second sets of memory buffers comprise random access memory (RAM). Each of the first and the second sets are logically defined. In other words, respective sizes of the first and the second sets can be reconfigured to accommodate respective amounts of imagery data and filter coefficients.

The first and the second I/O data bus 130a-130b are shown here to connect the CNN processing engines 122a-122h, 132a-132h in a sequential scheme. In another embodiment, the at least one I/O data bus may have different connection scheme to the CNN processing engines to accomplish the same purpose of parallel data input and output for improving performance.

Figure 2:
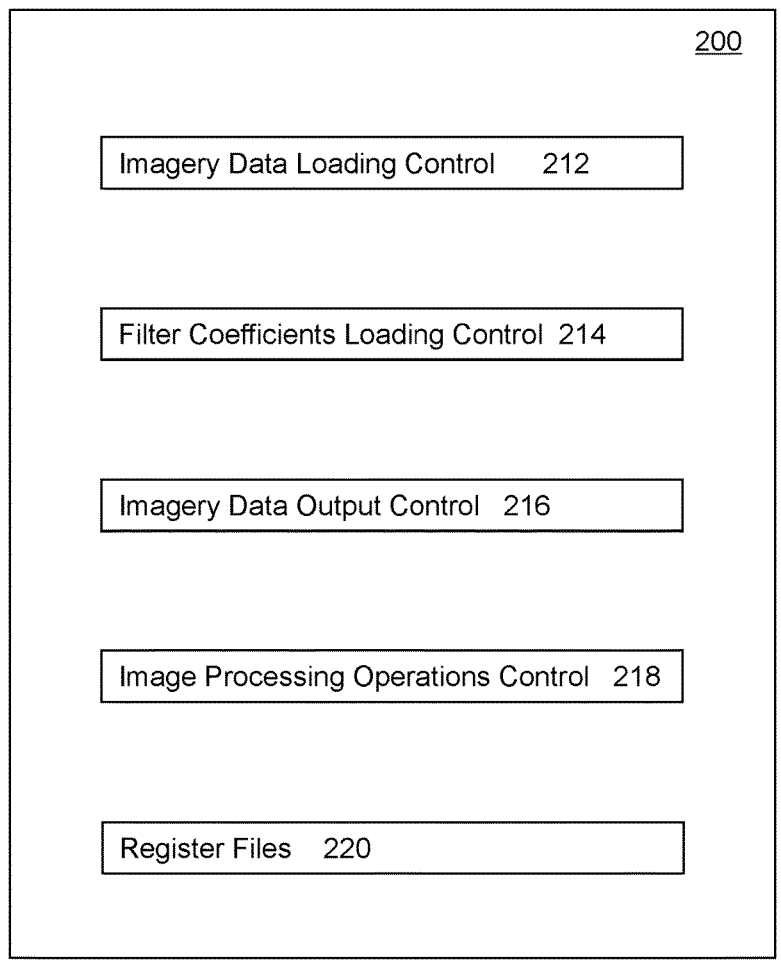
FIG. 2 is a function block diagram showing an example controller configured for controlling operations of one or more CNN processing engines according to an embodiment of the invention.

FIG. 2 is a diagram showing an example controller 200 for controlling various operations of at least one CNN processing engine configured on the integrated circuit. Controller 200 comprises circuitry to control imagery data loading control 212, filter coefficients loading control 214, imagery data output control 216, and image processing operations control 218. Controller 200 further includes register files 220 for storing the specific configuration (e.g., number of CNN processing engines, number of input/output data bus, etc.) in the integrated circuit.

Image data loading control 212 controls loading of imagery data to respective CNN processing engines via the corresponding I/O data bus. Filter coefficients loading control 214 controls loading of filter coefficients to respective CNN processing engines via corresponding I/O data bus. Imagery data output control 216 controls output of the imagery data from respective CNN processing engines via corresponding I/O data bus. Image processing operations control 218 controls various operations such as convolutions, rectifications and pooling operations which can be defined by user of the integrated circuit via a set of user defined directives (e.g., file contains a series of operations such as convolution, rectification, pooling, etc.).

Figure 3:
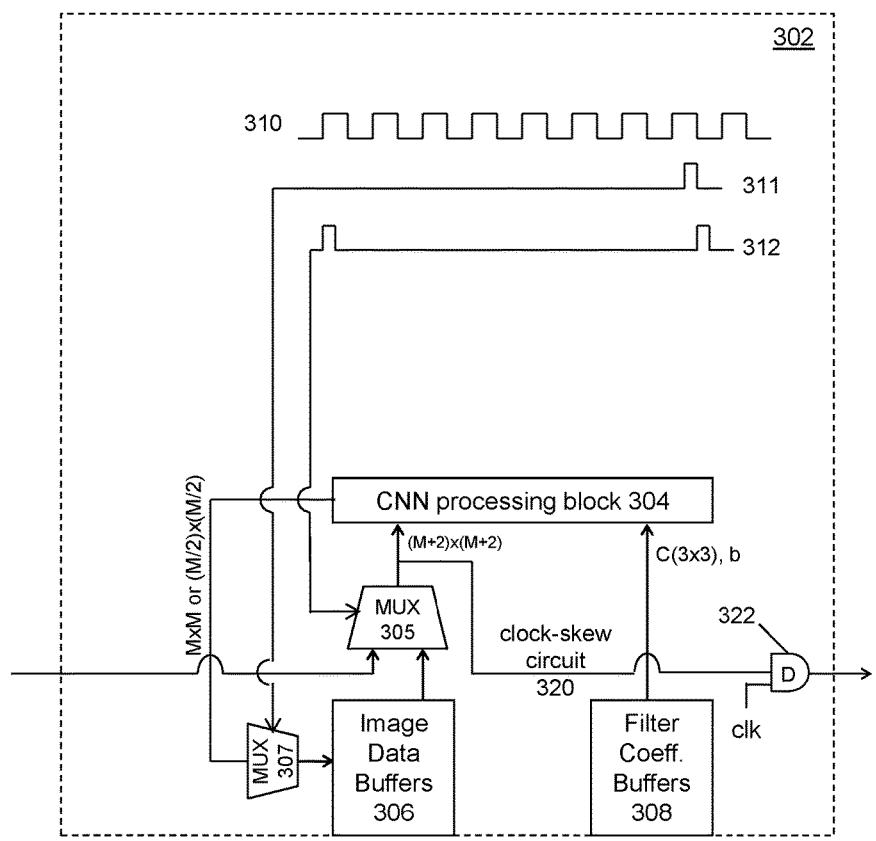
FIG. 3 is a diagram showing an example CNN processing engine in accordance with one embodiment of the invention.

More details of a CNN processing engine 302 are shown in FIG. 3. A CNN processing block 304 contains digital circuitry that simultaneously obtains M×M convolution operations results by performing 3×3 convolutions at M×M pixel locations using imagery data of a (M+2)-pixel by (M+2)-pixel region and corresponding filter coefficients from the respective memory buffers. The (M+2)-pixel by (M+2)-pixel region is formed with the M×M pixel locations as an M-pixel by M-pixel central portion plus a one-pixel border surrounding the central portion. M is a positive integer. In one embodiment, M equals to 14 and therefore, (M+2) equals to 16, M×M equals to 14×14=196, and M/2 equals 7.

Figure 4:
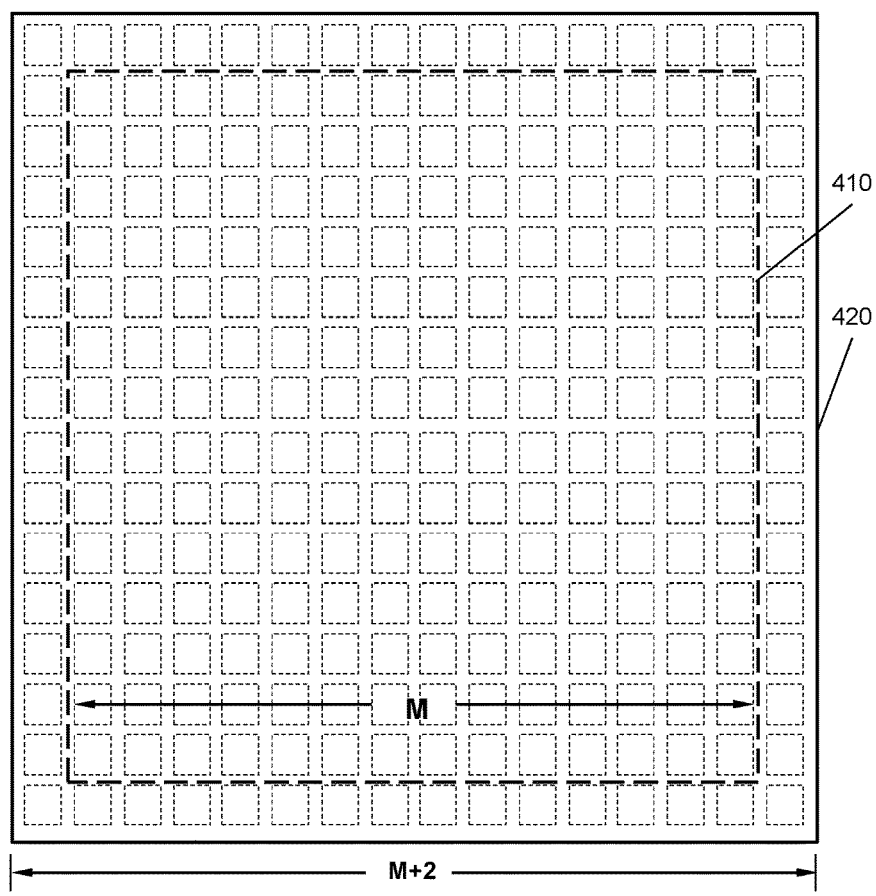
FIG. 4 is a diagram showing M×M pixel locations within a (M+2)-pixel by (M+2)-pixel region, according to an embodiment of the invention.

FIG. 4 is a diagram showing a diagram representing (M+2)-pixel by (M+2)-pixel region 410 with a central portion of M×M pixel locations 420 used in the CNN processing engine 302.

Imagery data may represent characteristics of a pixel in the input image (e.g., one of the color (e.g., RGB (red, green, blue)) values of the pixel, or distance between pixel and observing location). Generally, the value of the RGB is an integer between 0 and 255. Values of filter coefficients are floating point integer numbers that can be either positive or negative.

In order to achieve faster computations, few computational performance improvement techniques have been used and implemented in the CNN processing block 304. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \le i,j \le 3} \text{In}(m, n, i, j) \times C(i, j) - b \qquad (1)$$

where:
  m, n are corresponding row and column numbers for identifying which imagery data (pixel) within the (M+2)-pixel by (M+2)-pixel region the convolution is performed;
  In(m,n,i,j) is a 3×3-pixel by 3-pixel area centered at pixel location (m, n) within the region;
  C(i,j) represents one of the nine weight coefficients C(3×3), each corresponds to one of the 3-pixel by 3-pixel area;
  b represents an offset coefficient; and
  j are indices of weight coefficients C(i, j).

Each CNN processing block 304 produces M×M convolution operations results simultaneously and, all CNN processing engines perform simultaneous operations.

Figure 5A:
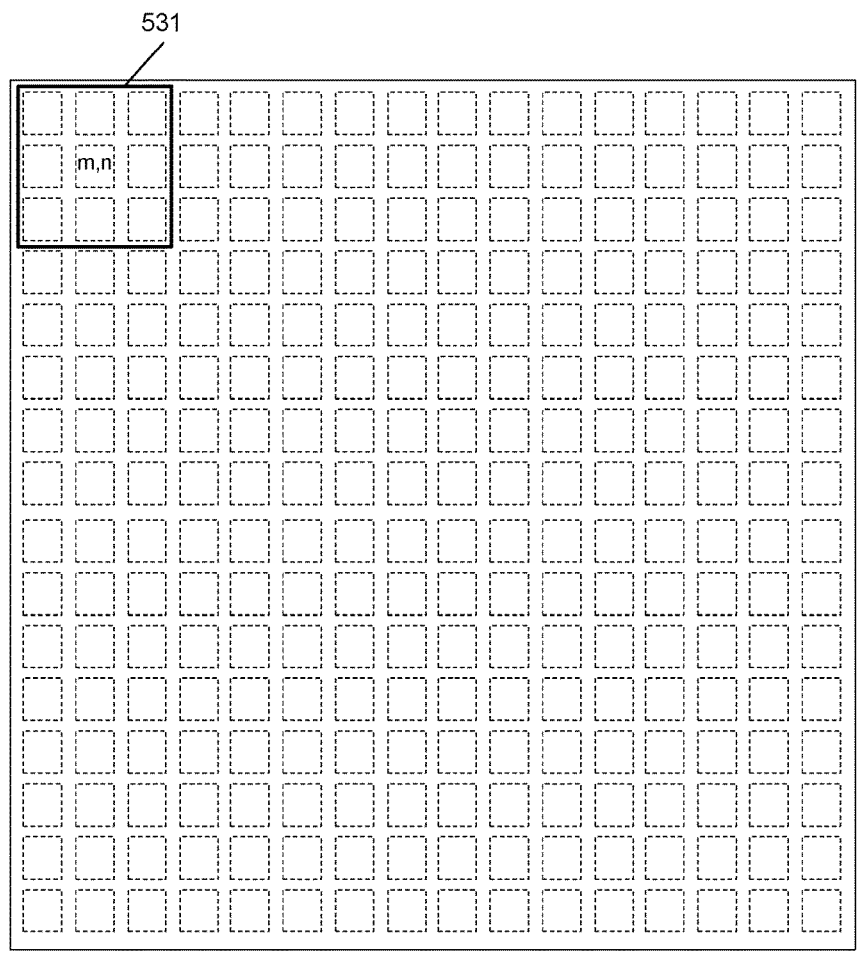
FIGS. 5A-5C are diagrams showing three example pixel locations, according to an embodiment of the invention.
Figure 5B:
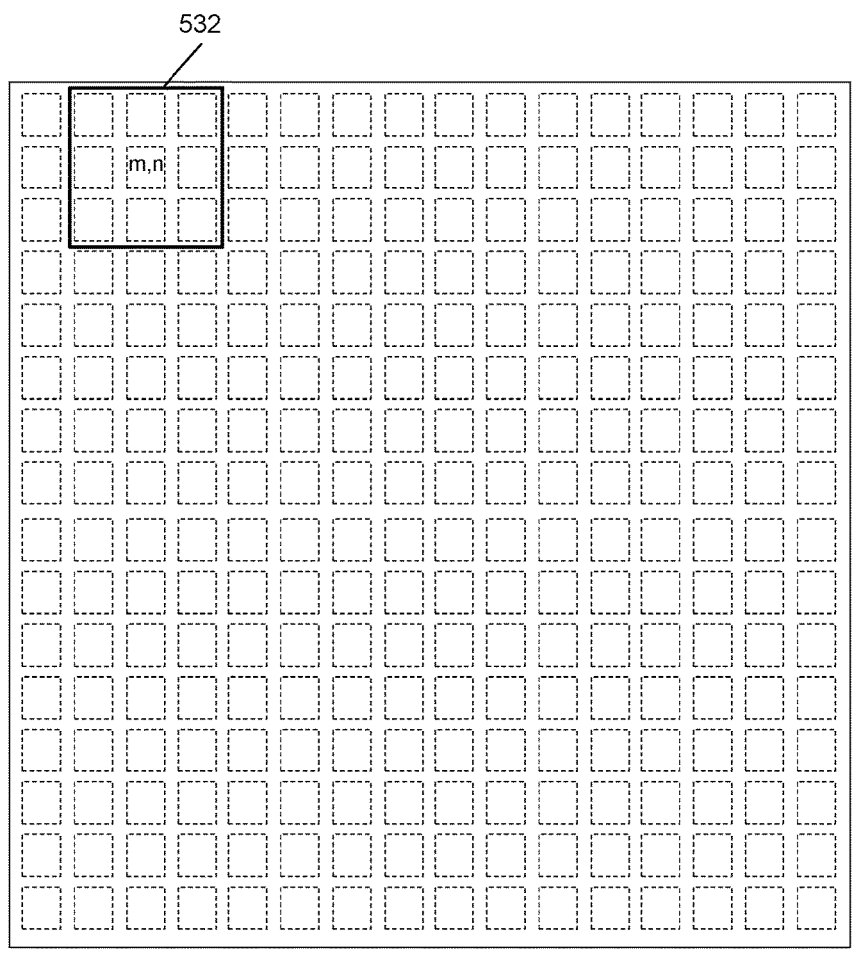
Figure 5C:
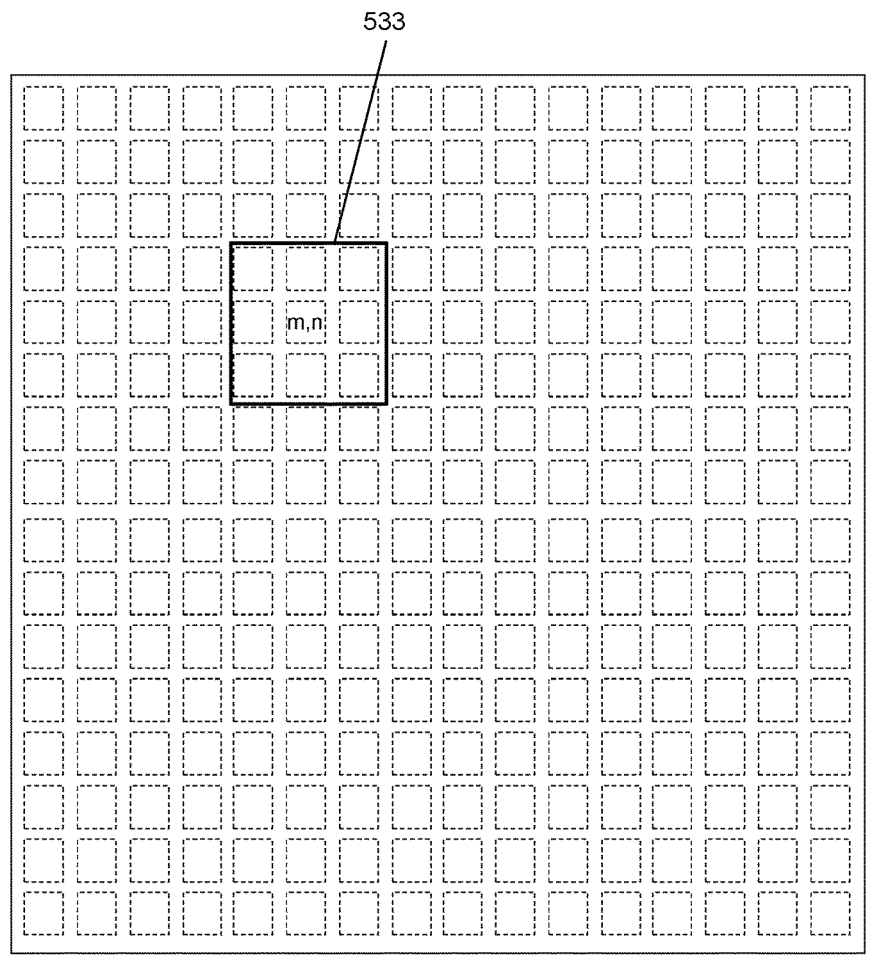

FIGS. 5A-5C show three different examples of the M×M pixel locations. The first pixel location 531 shown in FIG. 5A is in the center of a 3-pixel by 3-pixel area within the (M+2)-pixel by (M+2)-pixel region at the upper left corner. The second pixel location 532 shown in FIG. 5B is one pixel data shift to the right of the first pixel location 531. The third pixel location 533 shown in FIG. 5C is a typical example pixel location. M×M pixel locations contain multiple overlapping 3-pixel by 3-pixel areas within the (M+2)-pixel by (M+2)-pixel region.

Figure 6:
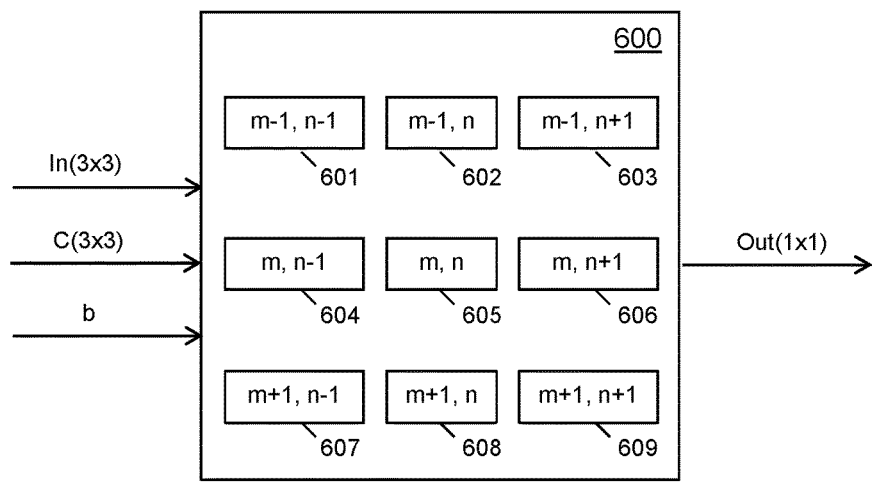
FIG. 6 is a diagram illustrating an example data arrangement for performing 3×3 convolutions at a pixel location, according to one embodiment of the invention.

To perform 3×3 convolutions at each sampling location, an example data arrangement is shown in FIG. 6. Imagery data (i.e., In(3×3)) and filter coefficients (i.e., weight coefficients C(3×3) and an offset coefficient b) are fed into an example CNN 3×3 circuitry 600. After 3×3 convolutions operation in accordance with Formula (1), one output result (i.e., Out(1×1)) is produced. At each sampling location, the imagery data In(3×3) is centered at pixel coordinates (m, n) 605 with eight immediate neighbor pixels 601-604, 606-609.

Figure 7:
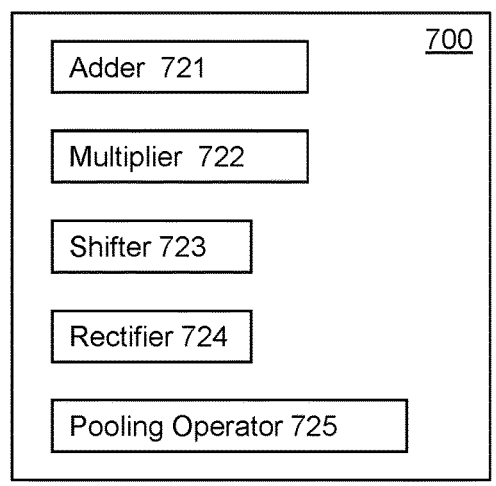
FIG. 7 is a function block diagram illustrating an example circuitry for performing 3×3 convolutions at a pixel location, according to one embodiment of the invention.

FIG. 7 is a function diagram showing an example CNN 3×3 circuitry 700 for performing 3×3 convolutions at each pixel location. The circuitry 700 contains at least adder 721, multiplier 722, shifter 723, rectifier 724 and pooling operator 725. In a digital semi-conductor implementation, all of these can be achieved with logic gates and multiplexers, which are generated using well-known methods (e.g., hardware description language such as Verilog, etc.). Adder 721 and multiplier 722 are used for addition and multiplication operations. Shifter 723 is for shifting the output result in accordance with fixed-point arithmetic involved in the 3×3 convolutions. Rectifier 724 is for setting negative output results to zero. Pooling operator 725 is for performing 2×2 pooling operations.

Imagery data are stored in a first set of memory buffers 306, while filter coefficients are stored in a second set of memory buffers 308. Both imagery data and filter coefficients are fed to the CNN block 304 at each clock of the digital integrated circuit. Filter coefficients (i.e., C(3×3) and b) are fed into the CNN processing block 304 directly from the second set of memory buffers 308. However, imagery data are fed into the CNN processing block 304 via a multiplexer MUX 305 from the first set of memory buffers 306. Multiplexer 305 selects imagery data from the first set of memory buffers based on a clock signal (e.g., pulse 312).

Otherwise, multiplexer MUX 305 selects imagery data from a first neighbor CNN processing engine (from the left side of FIG. 3 not shown) through a clock-skew circuit 320.

At the same time, a copy of the imagery data fed into the CNN processing block 304 is sent to a second neighbor CNN processing engine (to the right side of FIG. 3 not shown) via the clock-skew circuit 320. Clock-skew circuit 320 can be achieved with known techniques (e.g., a D flip-flop 322).

The first neighbor CNN processing engine may be referred to as an upstream neighbor CNN processing engine in the loop formed by the clock-skew circuit 320. The second neighbor CNN processing engine may be referred to as a downstream CNN processing engine. In another embodiment, when the data flow direction of the clock-skew circuit is reversed, the first and the second CNN processing engines are also reversed becoming downstream and upstream neighbors, respectively.

After 3×3 convolutions for each group of imagery data are performed for predefined number of filter coefficients, convolution operations results Out(m, n) are sent to the first set of memory buffers via another multiplex MUX 307 based on another clock signal (e.g., pulse 311). An example clock cycle 310 is drawn for demonstrating the time relationship between pulse 311 and pulse 312. As shown pulse 311 is one clock before pulse 312, as a result, the 3×3 convolution operations results are stored into the first set of memory buffers after a particular block of imagery data has been processed by all CNN processing engines through the clock-skew circuit 320.

Figure 8:
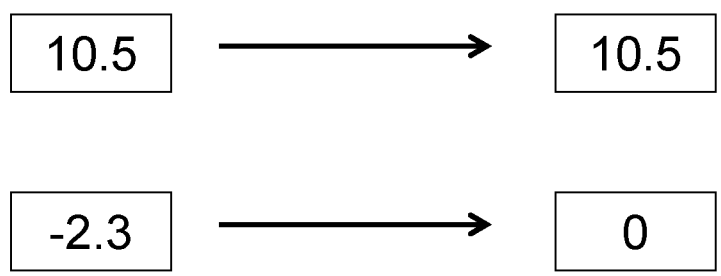
FIG. 8 is a diagram showing an example rectification according to an embodiment of the invention.

After the convolution operations result Out(m, n) is obtained from Formula (1), rectification procedure may be performed as directed by image processing control 218. Any convolution operations result, Out(m, n), less than zero (i.e., negative value) is set to zero. In other words, only positive value of output results are kept. FIG. 8 shows two example outcomes of rectification. A positive output value 10.5 retains as 10.5 while −2.3 becomes 0. Rectification causes non-linearity in the integrated circuits.

If a 2×2 pooling operation is required, the M×M output results are reduced to (M/2)×(M/2). In order to store the (M/2)×(M/2) output results in corresponding locations in the first set of memory buffers, additional bookkeeping techniques are required to track proper memory addresses such that four (M/2)×(M/2) output results can be processed in one CNN processing engine.

Figure 9A:
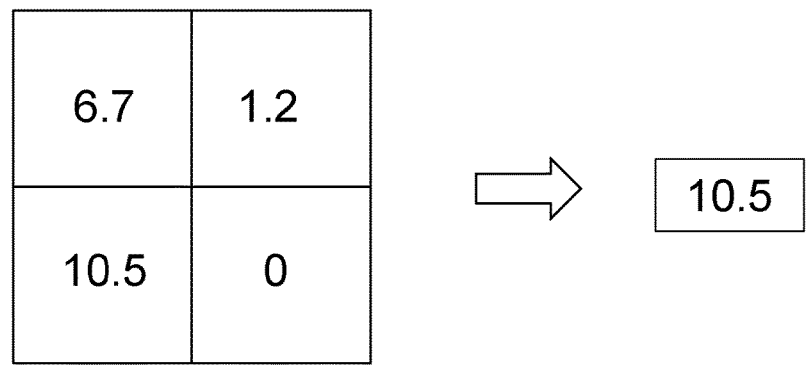
FIGS. 9A-9B are diagrams showing two example 2×2 pooling operations according to an embodiment of the invention.
Figure 9B:
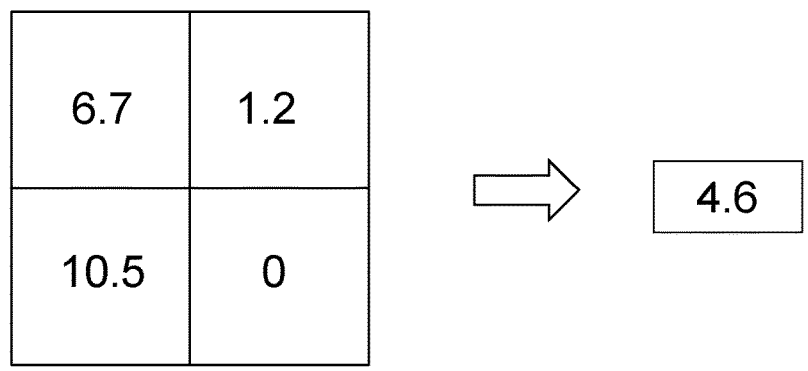
Figure 10:
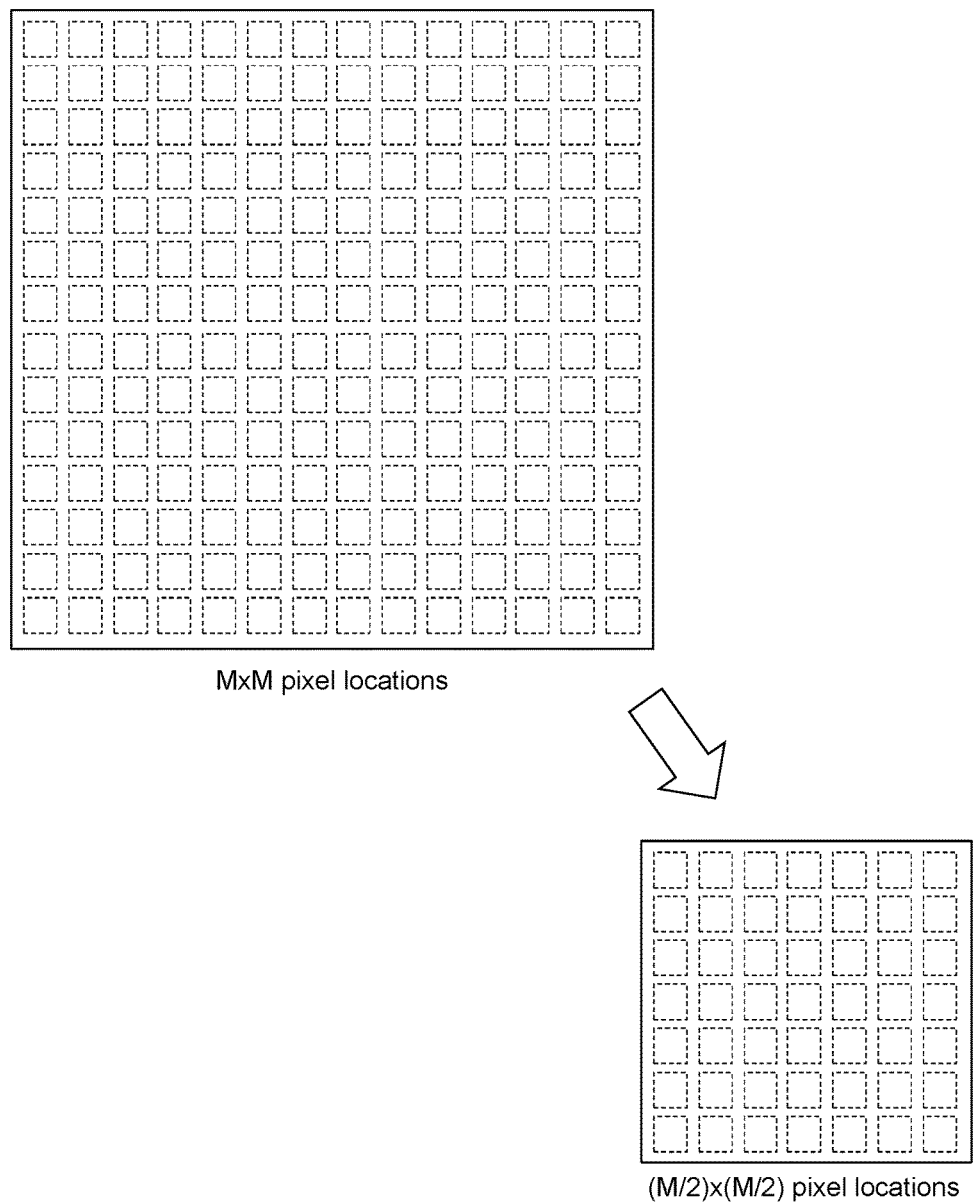
FIG. 10 is a diagram illustrating a 2×2 pooling operation reduces M-pixel by M-pixel block to a (M/2)-pixel by (M/2)-pixel block in accordance with one embodiment of the invention.

To demonstrate a 2×2 pooling operation, FIG. 9A is a diagram graphically showing first example output results of a 2-pixel by 2-pixel block being reduced to a single value 10.5, which is the largest value of the four output results. The technique shown in FIG. 9A is referred to as "max pooling". When the average value 4.6 of the four output results is used for the single value shown in FIG. 9B, it is referred to as "average pooling". There are other pooling operations, for example, "mixed max average pooling" which is a combination of "max pooling" and "average pooling". The main goal of the pooling operation is to reduce size of the imagery data being processed. FIG. 10 is a diagram illustrating M×M pixel locations, through a 2×2 pooling operation, are reduced to (M/2)×(M/2) locations, which is one fourth of the original size.

Figure 11A:
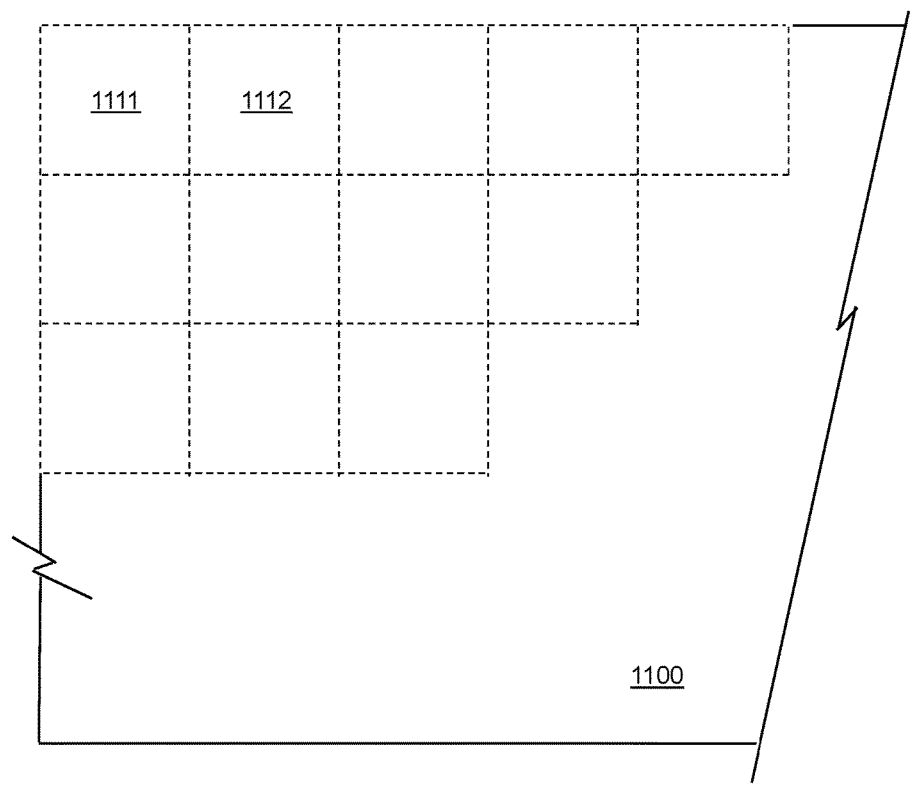
FIGS. 11A-11C are diagrams illustrating examples of M-pixel by M-pixel blocks and corresponding (M+2)-pixel by (M+2)-pixel region in an input image, according to one embodiment of the invention.

An input image generally contains a large amount of imagery data. In order to perform image processing operations. The input image 1100 is partitioned into M-pixel by M-pixel blocks 1111-1112 as shown in FIG. 11A. Imagery data associated with each of these M-pixel by M-pixel blocks is then fed into respective CNN processing engines. At each of the M×M pixel locations in a particular M-pixel by M-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with ($2^K$×M)-pixel by ($2^K$×M)-pixel is required. K is a positive integer (e.g., 1, 2, 3, 4, etc.). When M equals 14 and K equals 4, the characteristic dimension is 224. In another embodiment, the input image is a rectangular shape with dimensions of ($2^I$×M)-pixel and ($2^1$×M)-pixel, where I and J are positive integers.

Figure 11B:
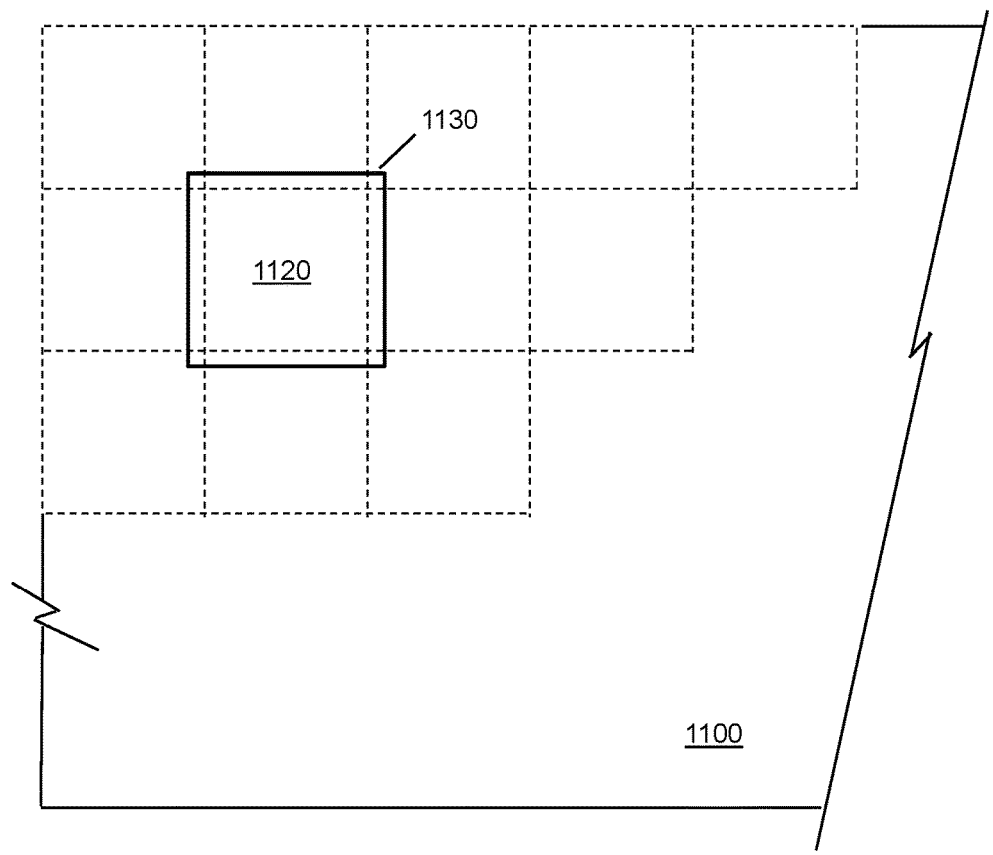
Figure 12:
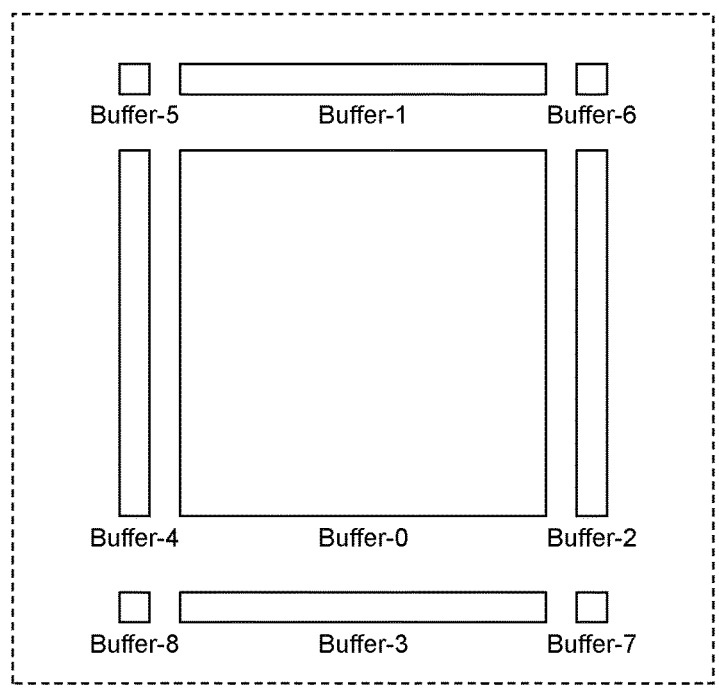
FIG. 12 is a diagram illustrating an example of a first set of memory buffers for storing received imagery data in accordance with an embodiment of the invention.

In order to properly perform 3×3 convolutions at pixel locations around the border of a M-pixel by M-pixel block, additional imagery data from neighboring blocks are required. FIG. 11B shows a typical M-pixel by M-pixel block 1120 (bordered with dotted lines) within a (M+2)-pixel by (M+2)-pixel region 1130. The (M+2)-pixel by (M+2)-pixel region is formed by a central portion of M-pixel by M-pixel from the current block, and four edges (i.e., top, right, bottom and left) and four corners (i.e., top-left, top-right, bottom-right and bottom-left) from corresponding neighboring blocks. Additional details are shown in FIG. 12 and corresponding descriptions for the first set of memory buffers.

Figure 11C:
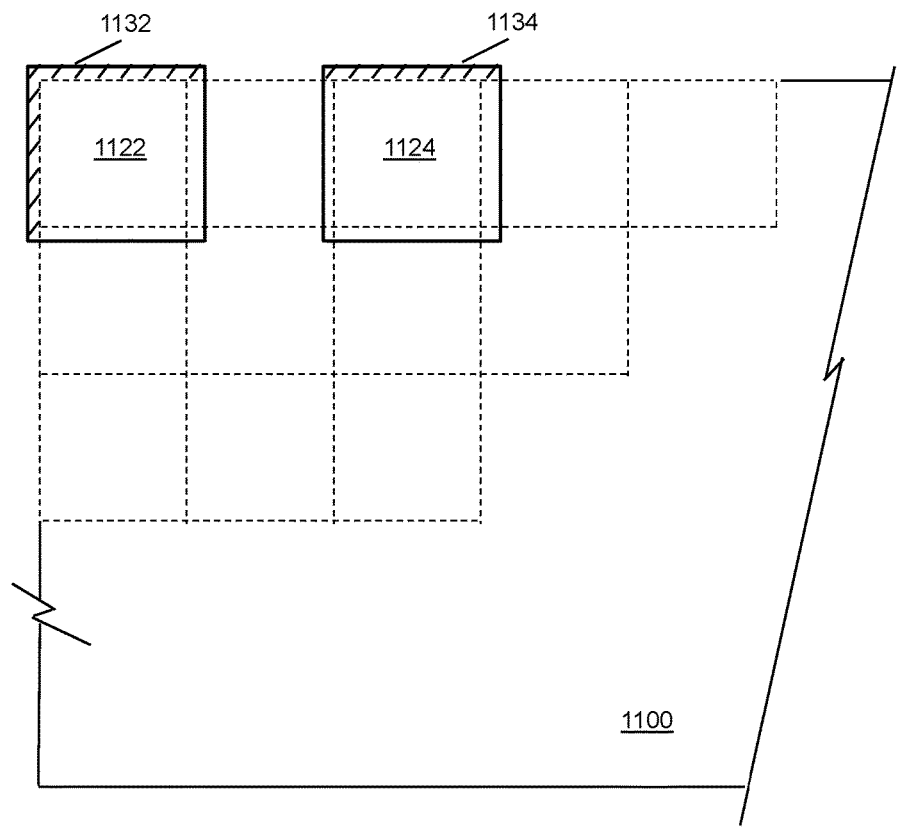

FIG. 11C shows two example M-pixel by M-pixel blocks 1122-1124 and respective associated (M+2)-pixel by (M+2)-pixel regions 1132-1134. These two example blocks 1122-1124 are located along the perimeter of the input image. The first example M-pixel by M-pixel block 1122 is located at top-left corner, therefore, the first example block 1122 has neighbors for two edges and one corner. Value "0"s are used for the two edges and three corners without neighbors (shown as shaded area) in the associated (M+2)-pixel by (M+2)-pixel region 1132 for forming imagery data. Similarly, the associated (M+2)-pixel by (M+2)-pixel region 1134 of the second example block 1124 requires "0"s be used for the top edge and two top corners. Other blocks along the perimeter of the input image are treated similarly. In other words, for the purpose to perform 3×3 convolutions at each pixel of the input image, a layer of zeros ("0"s) is added outside of the perimeter of the input image. This can be achieved with many well-known techniques. For example, default values of the first set of memory buffers are set to zero. If no imagery data is filled in from the neighboring blocks, those edges and corners would contain zeros.

Furthermore, an input image can contain a large amount of imagery data, which may not be able to be fed into the CNN processing engines in its entirety. Therefore, the first set of memory buffers is configured on the respective CNN processing engines for storing a portion of the imagery data of the input image. The first set of memory buffers contains nine different data buffers graphically illustrated in FIG. 12. Nine buffers are designed to match the (M+2)-pixel by (M+2)-pixel region as follows:
1) buffer-0 for storing M×M pixels of imagery data representing the central portion;
2) buffer-1 for storing 1×M pixels of imagery data representing the top edge;
3) buffer-2 for storing M×1 pixels of imagery data representing the right edge;
4) buffer-3 for storing 1×M pixels of imagery data representing the bottom edge;
5) buffer-4 for storing M×1 pixels of imagery data representing the left edge;
6) buffer-5 for storing 1×1 pixels of imagery data representing the top left corner;
7) buffer-6 for storing 1×1 pixels of imagery data representing the top right corner;
8) buffer-7 for storing 1×1 pixels of imagery data representing the bottom right corner; and
9) buffer-8 for storing 1×1 pixels of imagery data representing the bottom left corner.

Imagery data received from the I/O data bus are in form of M×M pixels of imagery data in consecutive blocks. Each M×M pixels of imagery data is stored into buffer-0 of the current block. The left column of the received M×M pixels of imagery data is stored into buffer-2 of previous block, while the right column of the received M×M pixels of imagery data is stored into buffer-4 of next block. The top and the bottom rows and four corners of the received M×M pixels of imagery data are stored into respective buffers of corresponding blocks based on the geometry of the input image (e.g., FIGS. 11A-11C).

Figure 13A:
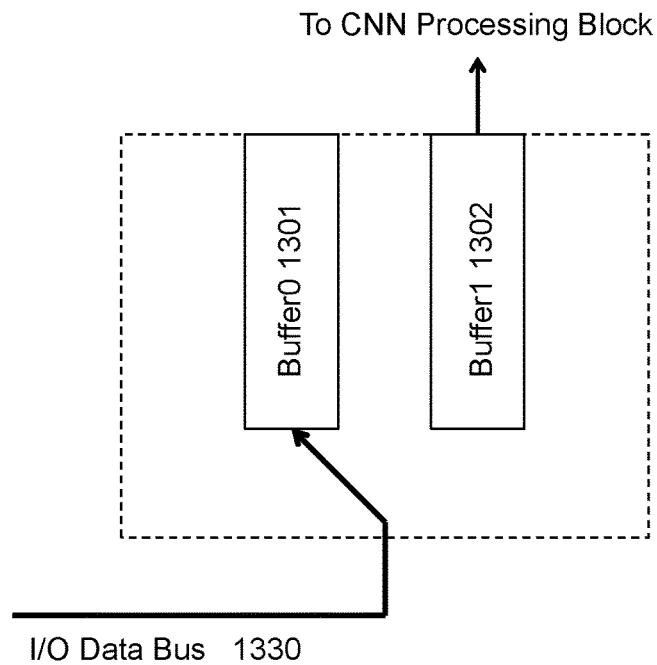
FIG. 13A is a diagram showing two operational modes of an example second set of memory buffers for storing filter coefficients in accordance with an embodiment of the invention.
Figure 13A:
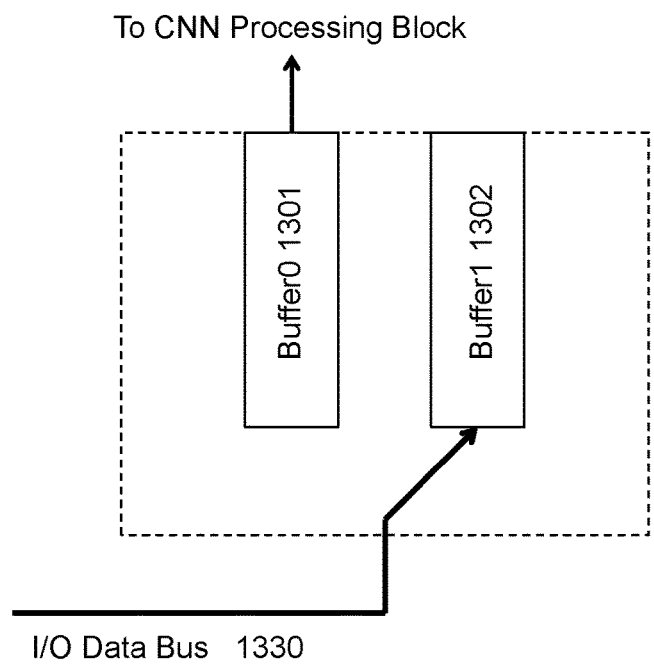

An example second set of memory buffers for storing filter coefficients are shown in FIG. 13A. In one embodiment, a pair of independent buffers Buffer0 1301 and Buffer1 1302 is provided. The pair of independent buffers allow one of the buffers 1301-1302 to receive data from the I/O data bus 1330 while the other one to feed data into a CNN processing block (not shown). Two operational modes are shown herein.

Figure 13B:
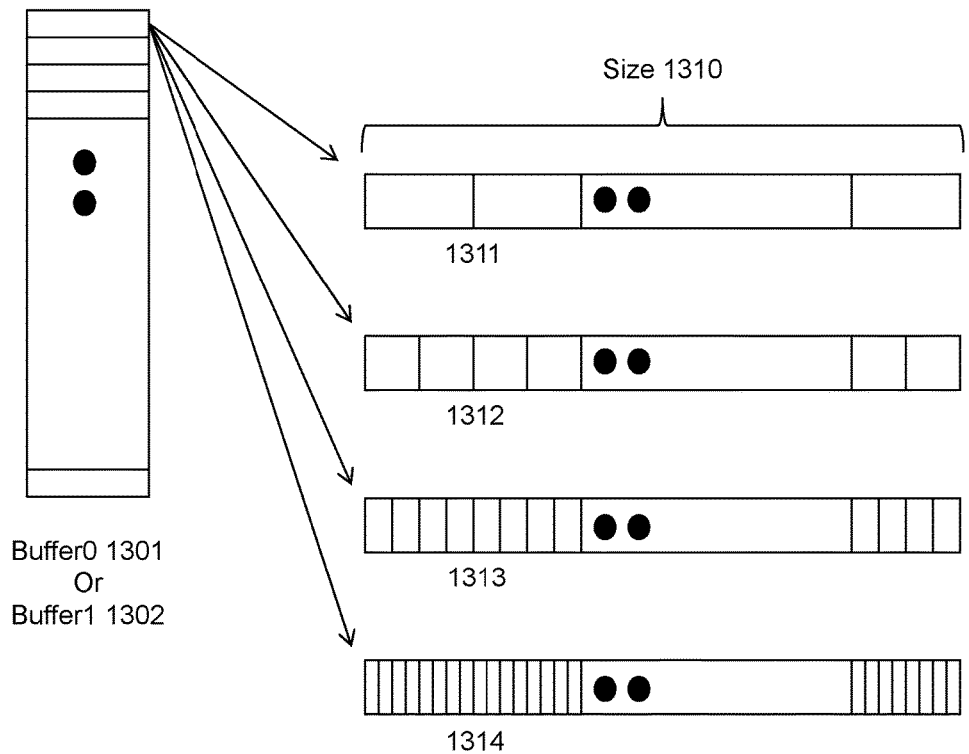
FIG. 13B is a diagram showing example storage schemes of filter coefficients in the second set of memory buffers, according to an embodiment of the invention.

Example storage schemes of filter coefficients are shown in FIG. 13B. Each of the pair of buffers (i.e., Buffer0 1301 or Buffer1 1302) has a width (i.e., word size 1310). In one embodiment, the word size is 120-bit. Accordingly, each of the filter coefficients (i.e., C(3×3) and b) occupies 12-bit in the first example storage scheme 1311. In the second example storage scheme 1312, each filter coefficient occupies 6-bit thereby 20 coefficients are stored in each word. In the third example scheme 1313, 3-bit is used for each coefficient hence four sets of filter coefficients (40 coefficients) are stored. Finally, in the fourth example storage scheme 1314, 80 coefficients are stored in each word, each coefficient occupies 1.5-bit.

In another embodiment, a third memory buffer can be set up for storing entire filter coefficients to avoid I/O delay. In general, the input image must be at certain size such that all filter coefficients can be stored. This can be done by allocating some unused capacity in the first set of memory buffers to accommodate such a third memory buffer. Since all memory buffers are logically defined in RAM (Random-Access Memory), well known techniques may be used for creating the third memory buffer. In other words, the first and the second sets of memory buffers can be adjusted to fit different amounts of imagery data and/or filter coefficients. Furthermore, the total amount of RAM is dependent upon what is required in image processing operations.

Figure 14:
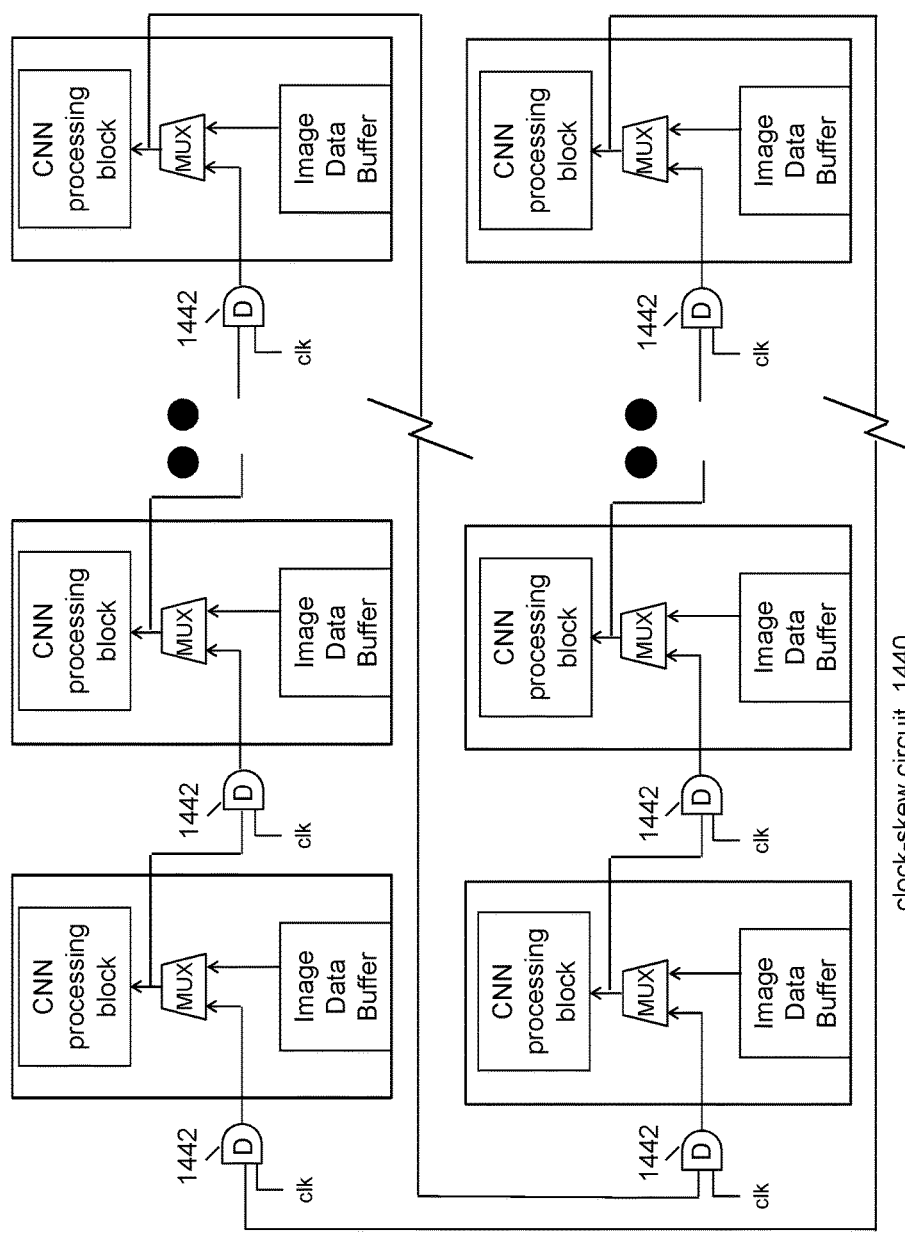
FIG. 14 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1440 for a group of CNN processing engines are shown in FIG. 14. The CNN processing engines connected via the second example clock-skew circuit 1440 form a loop. In other words, each CNN processing engine sends its own imagery data to a first neighbor and, at the same time, receives a second neighbor's imagery data. Clock-skew circuit 1440 can be achieved with well-known manners. For example, each CNN processing engine is connected with a D flip-flop 1442.

A special case with only two CNN processing engines are connected in a loop, the first neighbor and the second neighbor are the same.

Referring now to FIG. 15A, it is shown the order of convolution operations performed in a first example CNN based digital IC for extracting features out of an input image. The example CNN based digital IC contains four CNN processing engines connected with a clock-skew circuit (e.g., clock-skew circuit 1440 of FIG. 14) and two I/O/data bus. The I/O data bus #I serves CNN processing engines 1 and 2, while the I/O data bus #II serves CNN processing engines 3 and 4. The direction of the data access in the clock-skew circuit is Engine#1→Engine#2→Engine#3→Engine#4→Engine #1. In the first example, the upstream neighbor CNN processing engine for CNN processing engine #1 is CNN processing engine #4.

Eight sets of imagery data with 12 filters are used in the first example in FIG. 15A. Eight sets of imagery data is divided into two imagery data groups with each imagery data group containing 4 sets of imagery data. Filter coefficients of 12 filters are divided into three filter groups each filter groups containing 4 sets of filter coefficients. Each filter group is further divided into two subgroups corresponding to two imagery data groups. Each subgroup contains a portion of the 4 sets of filter coefficients correlating to a corresponding one of the two imagery data groups.

The order of the convolution operations for each block of the input image (e.g., block 1111 of the input image 1100 of FIG. 11A) starts with a first imagery data group of imagery data (i.e., Im(1), Im(2), Im(3) and Im(4)) being loaded (load-1) to respective CNN processing engines (i.e., Engines #1-4). To perform the convolution operations in cyclic manner based on the connectivity of the clock-skew circuit (e.g., clock-skew circuit 1440 of FIG. 14), filter coefficients of the first portion of the first filter group (i.e., F(i, j) for filters 1-4 correlating to Im(1)-Im(4)) are loaded. The order of the first portion is decided by cyclic access of imagery data from an upstream neighbor CNN processing engine. After four rounds of convolution operations, a second imagery data group (i.e., Im(5), Im(6), Im(7) and Im(8)) is loaded (load-2). Filter coefficient of a second portion of the first filter group (i.e, F(i, j) for filters 1-4 correlating to Im(5)-Im(8)) are loaded and used. After four rounds of convolution operations, the convolution operations results for filters 1-4 are outputted (output-1) and stored into a designated area of the first set of memory buffers of respective CNN processing engines.

Then, the convolution operations continue for remaining filter groups. The first imagery data group (i.e., Im(1)-Im(4)) is loaded (load-3) again into respective CNN processing engines. Filter coefficients of the first portion of the second filter group (i.e., F(i, j) for filters 5-8 correlating to Im(1)-Im(4)) are loaded. Four rounds of convolution operations are performed. The second imagery data group (i.e., Im(5)-Im(8)) is loaded (load-4). Filter coefficients of the second portion of the second filter group (i.e., F(i, j) for filters 5-8 correlating to Im(5)-Im(8)) are loaded for four more rounds of convolution operations. Convolution operations results for filters 5-8 are then outputted (output-2). This process continues for filter coefficients of the third filter group (i.e., filters 9-12) again using first and second portions. And the convolution operations results for filters 9-12 are outputted (output-3).

The order of convolution operations of a second example CNN based digital IC is shown in FIG. 15B. The second example IC is the same as the first example IC except the direction of data access in the clock-skew circuit is reversed (i.e., Engine#1→Engine #4→Engine#3→Engine#2→Engine #1). In other words, the upstream neighbor CNN processing engine for CNN processing engine #1 is CNN processing engine #2. As a result, the order of filter coefficients are different. However, the final convolution operations results are the same.

There can be other connection schemes to form a loop. Similar to the two examples shown in FIGS. 15A-15B, corresponding order of filter coefficients can be derived by those having ordinary skill in the art.

It is evident from the examples shown in FIGS. 15A-15B that any set of filter coefficients can be discarded after an output (i.e., output-1, output-2, output-3). As a results, the filter coefficient may be stored in first-in-first-out manner. However, each group of imagery data must be preserved as they may be reloaded for next set of filters. Since imagery data are stored in RAM (i.e., the first set of memory buffers), reloading operations can be performed with well known techniques.

The convolution operations between filter coefficients and imagery data are represented in the following formula:

$$Out(i) = \Sigma F(i,j) \otimes Im(j) \qquad (2)$$

where

F(i,j): filter coefficients of the i-th filter correlating to the j-th imagery data.

Im(j): the j-th imagery data.

Out(i): the i-th convolution operations result.

In examples shown in FIGS. 15A-15B, i=1, 12 while j=1, 8, hence there are 12 Out(i), 8 Im(j) and 12×8=96 F(i, j) filter coefficients. Other combinations of different numbers of imagery data, filters, CNN processing engines and I/O data bus can be similarly derived for those having ordinary skill in the art. If the number of imagery data is not a multiple of the number of CNN processing engines, any unfilled part is filled with zeros.

Also, two I/O data bus have been shown in the example connecting to CNN processing engines sequentially (i.e., the first half of the CNN processing engines to the first I/O data bus, the second half of the CNN processing engines to the second I/O data bus). However, I/O data bus may be connected to CNN processing engines differently, for example, in an alternating manner (i.e., CNN processing engines with odd number to the first I/O data bus, the others to the second I/O data bus).

Figure 16:
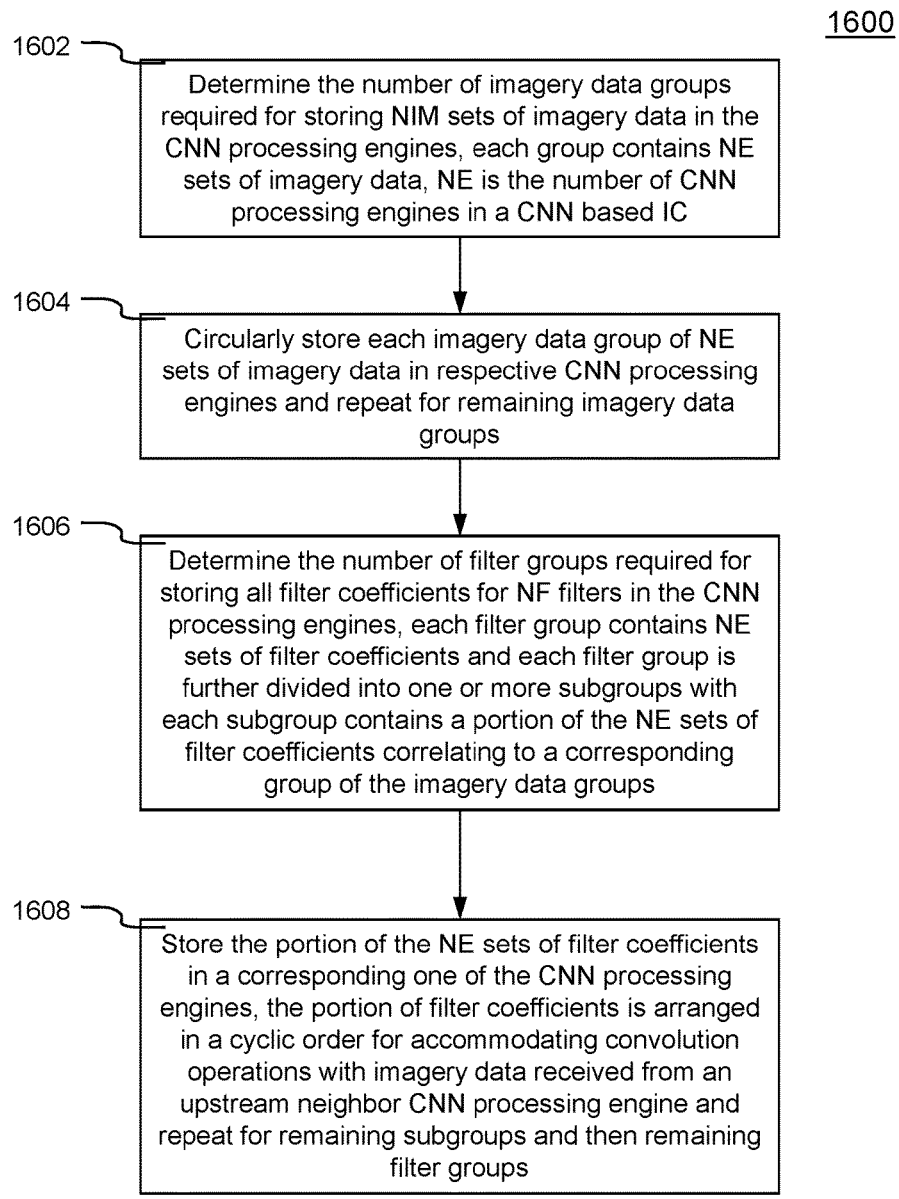
FIG. 16 is a flowchart showing an example process of arranging imagery data and filter coefficients of a CNN based digital IC, according to an embodiment of the invention.

FIG. 16 is a flowchart illustrating an example process 1600 of arranging imagery data and filter coefficients stored in a CNN based digital IC for extracting features out of an input image in accordance with an embodiment of the invention. The CNN based digital IC is configured with NE number of CNN processing engines connected in a loop via a clock-skew circuit (e.g., a group of CNN processing engines shown in FIG. 14). NE is a positive integer. In one embodiment, NE is 16. Process 1600 may be implemented in software.

Process 1600 starts at action 1602 by determining the number of imagery data groups required for storing all NIM sets of imagery data in the CNN processing engines. NIM is a positive integer. In one embodiment, NIM is 64. Each of the NIM sets of imagery data may contain one of the colors or distance or angle of the input image. One method to determine the number of imagery data groups is to divide NIM by NE and to make sure that one additional imagery data group to hold the remaining one if necessary. As a result, each imagery data group contains NE sets of imagery data.

Next at action 1604, the NE sets of imagery data are circularly stored in respective CNN processing engines. In other words, one set of imagery data is stores in a corresponding CNN processing engine. The remaining imagery data groups are then stored in the same manner (i.e., circularly). The examples in FIGS. 15A-15B show a first imagery data group contains sets 1-4 circularly stored in CNN processing engines 1-4. And a second imagery data group contains sets 5-8 also stored in CNN processing engines 1-4 circularly.

At action 1606, the number of filter groups required for storing all NF number of filter coefficients is determined. NF is a positive integer. In one embodiment, NF is 256. Each of the NF number of filters contains NIM sets of filter coefficients. In other words, the total number sets of filter coefficients is NF multiplied by NIM. Each filter group contains NE sets of filter coefficients (i.e., a portion of the NIM sets). Each filter group is further divided into one or more subgroups with each subgroup containing a portion of the NE sets that correlates to a corresponding group of the imagery data groups.

Next, at action 1608, the portion of the NE sets of filter coefficients is stored in a corresponding one of the CNN processing engines. The portion of filter coefficients is arranged in a cyclic order for accommodating convolution operations with imagery data received from an upstream neighbor CNN processing engine. And finally, action 1608 is repeated for any remaining subgroups and any remaining filter groups. The cyclic order is demonstrated in the examples shown in FIGS. 15A-15B.

When there are more than one I/O data bus configured on the CNN based digital IC, the order of imagery data and filter coefficients transmitted on the I/O data bus is adjusted in accordance with the connectivity between each I/O data bus with CNN processing engines. For example, a CNN based digital IC contains 16 CNN processing engines with two I/O data bus. The first I/O data bus connects to CNN processing engines #1-#8 while the second I/O data bus connects to CNN processing engines #9-#16. There are 32 sets of imagery data and 64 filters. Imagery data transmitted on the first I/O data bus is in the order of sets #1-#8 and #17-#24. Sets #9-#16 and #25-#32 are transmitted on the second I/O data bus. Similarly, the filter coefficients for filters 1-8, 17-24, 33-40 and 49-54 are on the first I/O data bus. Others are on the second I/O data bus.

The data arrangement in a CNN based digital IC is in a complex parallel manner. In other words, each of the CNN processing engines requires a specific cyclic order or sequence of the filter coefficients. However, imagery data and filter coefficients are transmitted through the at least one I/O data bus in a sequential order.

To demonstrate how the order of filter coefficients is arranged in each of the 16 CNN processing engines of a CNN based digital IC, an example pseudo-code for verifying 128 filters with 64 imagery data is listed as follows:

```
#include <unistd.h>
#include <stdio.h>
#include <stdlib.h>
#include <string.h>
#include <errno.h>
int read_flt(const char* fname, int out, double *bias,
double *flt);
int write_flt(const char* fname, int in, double *gain,
double *bias);
int main(int argc, char** argv) {
        double bias[128];
        double flt[3*3*64*128];
        char f_name[80];
        int out;
        int in;
        int out_size = 129;
        int in_size = 65;
        for (out = 1; out < out_size; out++) {
                sprintf(f_name, "flt_cnn/v6_%d.flt", out);
                read_flt(f_name, out, bias, flt);
        }
        for (in = 1; in < 17; in++) {// 16 processing engines
                sprintf(f_name, "../infile/flt_%d.in", in);
                write_flt(f_name, in, flt, bias);
        }
        return(0);
}
int read_flt(const char *fname, int out, double *bias,
double *flt) {
        FILE *fp;
        char *line = NULL;
        size_t len = 0;
        ssize_t read;
        int i, j;
        double data;
        fp = fopen(fname, "r");
        read = getline (&line, &len, fp); //skip
        read = getline (&line, &len, fp);
        sscanf(line, "%lf", &data);
        bias[out-1] = data;
        int n;
        int in_size = 65;
        int im_size = 64;
        for (n = 1; n < in_size; n++) {
                for (i = 0; i < 3; i++) {
                        read = getline (&line, &len, fp) ; //skip
                        for (j = 0; j < 3; j++) {
                                read = getline (&line, &len, fp); //skip
                                read = getline (&line, &len, fp);
                                sscanf(line, "%lf", &data);
                                flt[(out−1)*9*im_size+(n−1)*9+i*3+j] = data;
                        }
                }
                read = getline (&line, &len, fp); //skip
        }
        fclose(fp);
        return (0);
}
int write_flt(const char* fname, int in, double *gain,
double *bias) {
        FILE *fp;
        fp = fopen(fname, "w");
        int val;
        double shift = 8192.0; //shift 13-bits (12-bit data)
        int n, m, k;
        int index, n1664, m16, in164;
        printf("\n in = %d:", in);
        in164 = (in−1)*64;
```

```
            for (n = 1; n < 9; n++) { // 128/16 filter groups
            n1664 = (n-1)*16*64;
            for (m = 1; m < 5; m++) { // 64/16 imagery data groups
            m16 = (m-1)*16;
                printf("\n n = %d m = %d :\t", n, m);
                if (in < 16) {
                    for (index = in; index > 0; index--) { //1st set
                        printf("%d, ", n1664+in164+m16+index);
                        for (k = 0; k < 9; k++) {
                            val = gain[(n1664+in164+m16+index-1)*9+k] * shift;
                            val = val & 4095;
                            fprintf(fp, "%.3x ", val);
                        } //for k
                        val = 0;
                        fprintf(fp, "%.3x\n", val);
                    } //for index
                    for (index = 16; index > in+1; index--) { //2nd set
                        printf("%d, ", n1664+in164+m16+index);
                        for (k = 0; k < 9; k++) {
                            val = gain[(n1664+in164+m16+index-1)*9+k] * shift;
                            val = val & 4095;
                            fprintf(fp, "%.3x ", val);
                        } //for k
                        val = 0;
                        fprintf(fp, "%.3x\n", val);
                    } //for index
                    index = in+1;
                    printf("%d, ", n1664+in164+m16+index);
                    for (k = 0; k < 9; k++) { // last
                        val = gain[(n1664+in164+m16+index-1)*9)+k] * shift;
                        val = val & 4095;
                        fprintf(fp, "%.3x ", val);
                    } //for k
                    if (m == 4) {
                        val = bias[(n-1)*16 + (in-1)] * shift;
                        val = val & 4095;
                        fprintf(fp, "%.3x\n", val);
                    } else {
                        val = 0;
                        fprintf(fp, "%.3x\n", val);
                    }
                } else { // for in == 16
                    for (index = in; index > 1; index--) {
                        printf("%d, ", n1664+in164+m16+index);
                        for (k = 0; k < 9; k++) {
                            val = gain[(n1664+in164+m16+index-1)*9)+k] * shift;
                            val = val & 4095;
                            fprintf(fp, "%.3x ", val);
                        } //for k
                        val = 0;
                        fprintf(fp, "%.3x\n", val);
                    } //for index
                    index = 1;
                    printf("%d, ", n1664+in164+m16+index);
                    for (k = 0; k < 9; k++) { // last
                        val = gain[(n1664+in164+m16+index-1)*9+k] * shift;
                        val = val & 4095;
                        fprintf(fp, "%.3x ", val);
                    } //for k
                    if (m == 4) {
                        val = bias[(n-1)*16 + (in-1)] * shift;
                        val = val & 4095;
                        fprintf(fp, "%.3x\n", val);
                    } else {
                        val = 0;
                        fprintf(fp, "%.3x\n", val);
                    }
                } //in == 16
            } //for m
            } //for n
            printf("\n");
            fclose(fp);
            return (0);
}
```

One example scheme to transmit imagery data and filter coefficients through the at least one I/O data bus is to arrange imagery data and filter coefficients for each of the CNN processing engines. Example imagery data arrangement of a CNN based digital IC with 16 CNN processing engines is shown in FIG. 17. The imagery data order for the first CNN processing engine is arranged in the following order: (imagery data 1-17-33-49- . . . ). The order for the ninth CNN processing engine is as follows: (imagery data 9-25-41-57- . . . ). When a first I/O data bus connects CNN processing engines 1-8 and a second I/o data bus connects CNN processing engines 9-16, the example imagery data orders shown in FIG. 17 are the beginning of respective I/O data bus.

Figure 18:
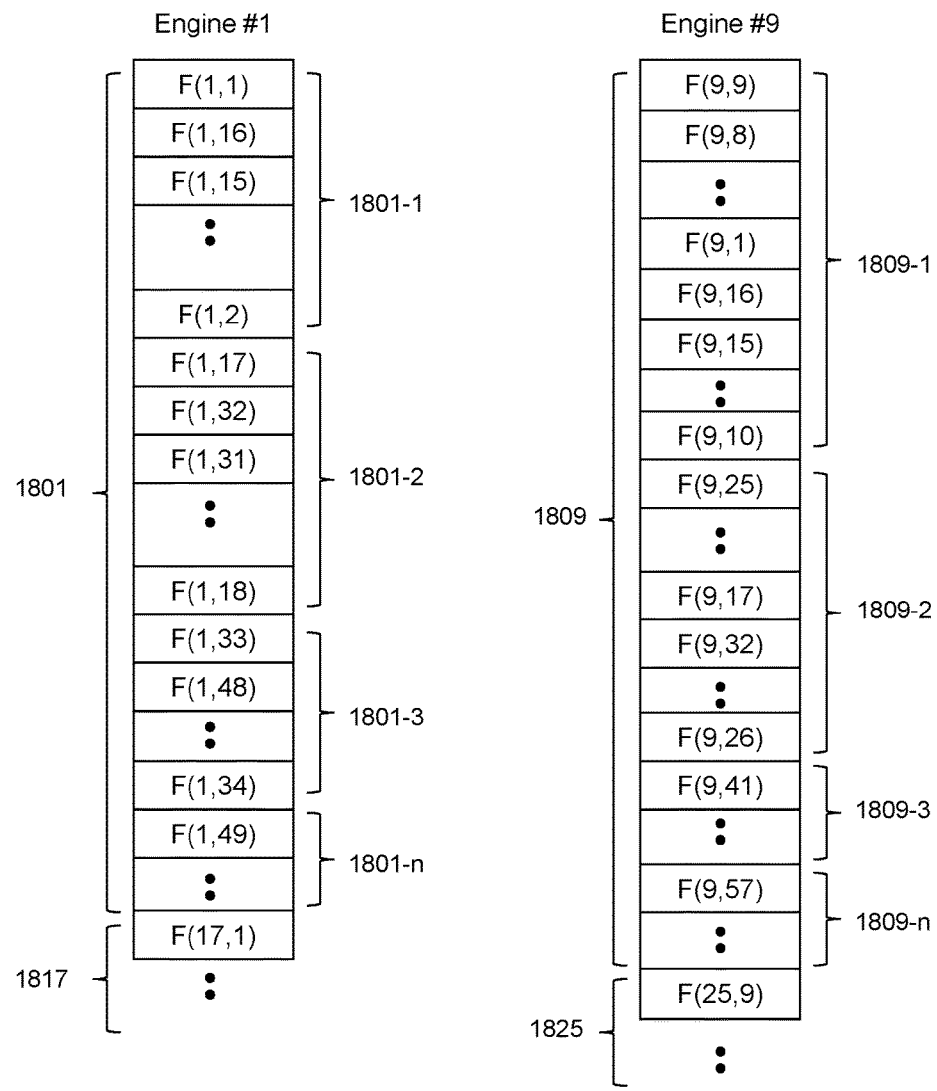
FIG. 18 is a diagram showing an example data arrangement of filter coefficients according to one embodiment of the invention.

FIG. 18 is a diagram showing example data arrangement of filter coefficients a CNN based digital IC having 16 CNN processing engines. Filter coefficients for the first filter 1801 are stored in CNN processing engine #1. Filter coefficients for the second filter are stored in CNN processing engine #2 (not shown). Coefficients for the ninth filter 1809 are store in CNN processing engine #9. Since there are 16 CNN processing engines, filter coefficients for filters 1-16 are stored in respective CNN processing engines as a first filter group. In the second filter group, filter coefficients for the 17th filter 1817 are store in CNN processing engine #1. And filter coefficients for the 25th filter 1825 are store in CNN Processing engine #9, etc.

Filter coefficients of the first filter are further divided into one or more subgroups containing a portion correlated to a corresponding imagery data group. Filter coefficient of the first subgroup 1801 within the first filter is a portion that correlates to the first imagery data group (i.e., imagery data 1-16). The second subgroup 1801-2 containing another portion that correlates to the second imagery data group (i.e., imagery data 17-32). The third subgroup 1801-3 correlates to the third imagery data group (i.e., imagery data 33-48). The remaining subgroups 1801-*n* correlate to remaining corresponding imagery data. Subgroups for the 17th filter are similarly created (not shown).

Similarly, for the ninth filter, the first subgroup 1809-1, the second subgroup 1809-2, the third subgroup 1809-3 and the remaining subgroup 1809-*n* correlate to respective imagery data groups. Filter coefficients order of each filter are different depend upon not only the number of CNN processing engines and how the CNN processing engines are connected via clock-skew circuit, but also the number of filters and the number of imagery data.

Although the invention has been described with reference to specific embodiments thereof, these embodiments are merely illustrative, and not restrictive of, the invention. Various modifications or changes to the specifically disclosed exemplary embodiments will be suggested to persons skilled in the art. For example, whereas the input image has been shown and described as partitioning into M-pixel by M-pixel blocks in certain order, other orders may be used in the invention to achieve the same, for example, the ordering of the M-pixel by M-pixel blocks may be column-wise instead of row-wise. Furthermore, whereas M-pixel by M-pixel blocks have been shown and described using M equals to 14 as an example. M can be chosen as other positive integers to accomplish the same, for example, 16, 20, 30, etc. Additionally, whereas the 3×3 convolution and 2×2 pooling have been shown and described, other types of convolution and pooling operations may be used to achieve the same, for example, 5×5 convolution and 3×3 pooling. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of arranging and storing imagery data and filter coefficients in a Cellular Neural Networks (CNN) based digital integrated circuit (IC) for extracting features out of an input image, the CNN based digital IC containing NE CNN processing engines connected in a loop via a clock-skew circuit, NE is a positive integer, the method comprising:
    (a) determining how many imagery data groups are required for storing NIM sets of imagery data in the NE CNN processing engines, each imagery data group containing NE sets of the NIM sets of imagery data, where NIM is a positive integer;
    (b) circularly storing the NE sets of the imagery data of said each imagery data group in the respective NE CNN processing engines;
    (c) repeating (b) for the remaining imagery data groups;
    (d) determining how many filter groups are required for storing all filter coefficients for NF filters in the NE CNN processing engines, each filter group containing NE sets of filter coefficients and said each filter group being further divided into one or more subgroups with each subgroup containing a portion of the NE sets of filter coefficients that correlates to a corresponding group of the imagery data groups, where NF is a positive integer;
    (e) storing the portion of the NE sets of filter coefficients in a corresponding one of the NE CNN processing engines, the portion of filter coefficients being arranged in a cyclic order for accommodating convolution operations with imagery data received from an upstream neighbor CNN processing engine; and
    (f) repeating (e) for the remaining subgroups; and
    (g) repeating (e) and (f) for the remaining filter groups,
    wherein each of the NE CNN processing engines comprises:
        a CNN processing block configured for simultaneously obtaining M×M convolution operations results by performing 3×3 convolutions at M×M pixel locations using the stored imagery data and the stored filter coefficients, the stored imagery data representing a (M+2)-pixel by (M+2)-pixel region with the M×M pixel locations being a M×M central portion of the (M+2)-pixel by (M+2)-pixel region, where M is a positive integer;
        a first set of memory buffers operatively coupled to the CNN processing block for storing one of the NE sets of imagery data; and
        a second set of memory buffers operatively coupled to the CNN processing block for storing the portion of the NE sets of filter coefficients corresponding to said one of the NE sets of imagery data.

2. The method of claim 1, where said all filter coefficients contains NF multiplied by NIM sets of filer coefficients.

3. The method of claim 1, wherein the CNN based digital IC further comprises more than one input/output (I/O) data bus connected to the NE CNN processing engines with a connection scheme.

4. The method of claim 3, further comprises partitioning the NIM sets of imagery data and said all filter coefficients in the respective I/O data bus in accordance with the connection scheme.

5. The method of claim 3, wherein said convolution operations produce NF convolution operations results.

6. The method of claim 3, wherein NE is equal to 16.

7. The method of claim 3, when said each imagery data group contains less than NE sets, unoccupied sets are filled with zeros.

8. A non-transitory computer readable medium storing imagery data and filter coefficients using a data arrangement scheme enabling a cellular neural networks (CNN) based digital integrated circuit (IC) for extracting features out of an input image, the data arrangement scheme comprising:

NIM sets of imagery data organized in at least one imagery data group, each imagery data group including NE sets of imagery data circularly stored in respective NE CNN processing engines of the CNN based digital IC; and all filter coefficients of NF filters organized in at least one filter group, each filter having NIM sets of filter coefficients and each filter group containing NE sets of filter coefficients and being further divided into one or more subgroups with each subgroup containing a portion of the NE sets of filter coefficients that correlates to a corresponding group of the imagery data groups, the portion of the NE sets of filter coefficients are stored in a corresponding one of the NE CNN processing engine, the portion of filter coefficients being arranged in a cyclic order for accommodating convolution operations with imagery data received from an upstream neighbor CNN processing engine, where NE, NIM and NF are positive integers, and wherein each of the NE CNN processing engines comprises:

a CNN processing block configured for simultaneously obtaining M×M convolution operations results by performing 3×3 convolutions at M×M pixel locations using the stored imagery data and the stored filter coefficients, the stored imagery data representing a (M+2)-pixel by (M+2)-pixel region with the M×M pixel locations being a M×M central portion of the (M+2)-pixel by (M+2)-pixel region, where M is a positive integer;

a first set of memory buffers operatively coupled to the CNN processing block for storing one of the NE sets of imagery data; and a second set of memory buffers operatively coupled to the CNN processing block for storing the portion of the NE sets of filter coefficients corresponding to said one of the NE sets of imagery data.

9. The non-transitory computer readable medium of claim 8, wherein said all filter coefficients contains NF multiplied by NIM sets of filer coefficients.

10. The non-transitory computer readable medium of claim 8, wherein NE is equal to 16.

11. The non-transitory computer readable medium of claim 8, wherein said convolution operations produce NF convolution operations results.

12. The non-transitory computer readable medium of claim 8, when said each imagery data group contains less than NE sets, unoccupied sets are filled with zeros.

* * * * *